United States Patent
Sakashita et al.

(10) Patent No.: US 12,287,504 B2
(45) Date of Patent: Apr. 29, 2025

(54) INTERFERENCE FILTER, AND METHOD OF MANUFACTURING INTERFERENCE FILTER

(71) Applicant: SEIKO EPSON CORPORATION, Tokyo (JP)

(72) Inventors: Tomoki Sakashita, Shiojiri (JP); Teruyuki Nishimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 396 days.

(21) Appl. No.: 17/812,020

(22) Filed: Jul. 12, 2022

(65) Prior Publication Data
US 2023/0009008 A1   Jan. 12, 2023

(30) Foreign Application Priority Data
Jul. 12, 2021   (JP) .................. 2021-115236

(51) Int. Cl.
*G02B 5/28* (2006.01)
*G02B 5/08* (2006.01)
*G02B 5/26* (2006.01)

(52) U.S. Cl.
CPC ........... *G02B 5/287* (2013.01); *G02B 5/0841* (2013.01); *G02B 5/26* (2013.01)

(58) Field of Classification Search
CPC ...... G02B 5/28; G02B 5/284; G02B 6/29358; G02B 5/285; G02B 5/288; G02B 26/001; G02B 26/007; G01J 3/26

(Continued)

(56) References Cited

U.S. PATENT DOCUMENTS 245,852 A    8/1881  Mathews et al.
9,170,418 B2  10/2015  Arakawa et al.
(Continued)

FOREIGN PATENT DOCUMENTS

CN   111356907 A  *  6/2020  ........... B81B 7/0067
JP   2011053510 A      3/2011
(Continued)

OTHER PUBLICATIONS

Office Action for JP Patent Application No. 2021115236, issued on Jan. 14, 2025.

*Primary Examiner* — Arnel C Lavarias
(74) *Attorney, Agent, or Firm* — CHIP LAW GROUP

(57) ABSTRACT

An interference filter includes a transmissive first substrate including a first inner surface and a first outer surface facing each other, in which the first inner surface is provided with a first reflection film, a transmissive second substrate including a second inner surface and a second outer surface facing each other, in which the second inner surface is provided with a second reflection film, a first bonding portion configured to bond the first inner surface and the second inner surface to each other, and seal a first inner space between the first substrate and the second substrate, a transmissive third substrate facing the first outer surface, a second bonding portion configured to bond the first outer surface and the third substrate to each other, and seal a second inner space between the first substrate and the third substrate, a transmissive fourth substrate facing the second outer surface, and a third bonding portion configured to bond the second outer surface and the fourth substrate to each other, and seal a third inner space between the second substrate and the fourth substrate, wherein the first inner space, the second inner space, and the third inner space are lower in pressure than atmospheric pressure.

8 Claims, 12 Drawing Sheets

(58) Field of Classification Search
USPC ....... 359/578, 579, 577, 237, 238, 239, 290,
359/291, 295; 356/450, 451, 454, 480,
356/505, 506, 519
See application file for complete search history.

(56) References Cited

U.S. PATENT DOCUMENTS

| | | |
|---|---|---|
| 9,243,154 B2 | 1/2016 | Nakano et al. |
| 9,713,926 B2 | 7/2017 | Nakano et al. |
| 10,780,717 B2 | 9/2020 | Nakano et al. |
| 11,059,304 B2 | 7/2021 | Nakano et al. |
| 2006/0194029 A1 | 8/2006 | Tsujihata |
| 2006/0222832 A1 | 10/2006 | Shimohara |
| 2007/0225404 A1 | 9/2007 | Umebayashi et al. |
| 2009/0227733 A1 | 9/2009 | Miura |
| 2013/0038876 A1 | 2/2013 | Arakawa et al. |
| 2013/0083400 A1 | 4/2013 | Nishimura et al. |
| 2014/0263983 A1* | 9/2014 | Hirokubo .................. G01J 3/26 359/578 |
| 2014/0268344 A1 | 9/2014 | Arakawa |

FOREIGN PATENT DOCUMENTS

| | | |
|---|---|---|
| JP | 2012163912 A | 8/2012 |
| JP | 2013076778 A | 4/2013 |
| JP | 2013077012 A | 4/2013 |
| JP | 2014178409 A | 9/2014 |

\* cited by examiner

INTERFERENCE FILTER, AND METHOD OF MANUFACTURING INTERFERENCE FILTER

The present application is based on, and claims priority from JP Application Serial Number 2021-115236, filed Jul. 12, 2021, the disclosure of which is hereby incorporated by reference herein in its entirety.

BACKGROUND

1. Technical Field

The present disclosure relates to an interference filter, and a method of manufacturing an interference filter.

2. Related Art

In the past, an interference filter has been known that includes a first substrate provided with a first reflection film, and a second substrate provided with a second reflection film, and the first substrate and the second substrate are disposed facing each other and bonded to each other, such that the first reflection film and the second reflection film face each other via a gap. Such an interference filter can emit light having a desired wavelength from incident light, in accordance with a dimension of the gap of the first reflection film and the second reflection film. Further, for example, a movable portion held by a diaphragm or the like is provided at the second substrate, the movable portion is provided with the second reflection film, the movable portion is displaced toward the first substrate by a driving means such as an electrostatic actuator, and thus a wavelength of light emitted from the interference filter can be changed.

In such an interference filter, a third substrate is provided on a side of the second substrate opposite to the first substrate to drive the movable portion, and each of a gap between the first substrate and the second substrate, and a gap between the second substrate and the third substrate is maintained in a reduced pressure state. This makes it possible to improve drive responsiveness when the movable portion is driven (for example, JP 2014-178409 A).

However, in the interference filter of JP 2014-178409 A described above, a pressure on a side of the first substrate opposite to the second substrate is atmospheric pressure, and thus there is a possibility that the first substrate is flexed due to a difference between a pressure between the first substrate and the second substrate, and a pressure on the side of the first substrate opposite to the second substrate. Since the first substrate is provided with the first reflection film, when such flexure occurs, a dimension of a gap between the first reflection film and the second reflection film changes depending on position, and there is a lot of noise in a wavelength of light emitted from the interference filter. That is, spectral accuracy of the interference filter is lowered so that not only light of a desired target wavelength but also light of a plurality of wavelength components is included in emitted light. In particular, an interference filter or the like that disperses light in a near-infrared range may emit light having a narrow wavelength half-width, and in such an interference filter, an effect of the flexure of the first substrate is increased.

SUMMARY

In view of the problems described above, an object of the present disclosure is to provide an interference filter that has high drive responsiveness, and is capable of precisely dispersing light having a desired target wavelength, and a method of manufacturing an interference filter.

An interference filter according to a first aspect of the present disclosure includes a first substrate including a first inner surface and a first outer surface facing each other, the first substrate being transmissive and including, at the first inner surface, a first reflection film, a second substrate including a second inner surface and a second outer surface facing each other, the second substrate being transmissive and including, at the second inner surface, a second reflection film facing the first reflection film, a first bonding portion configured to bond the first inner surface and the second inner surface to each other, the first bonding portion sealing a first inner space between the first substrate and the second substrate, a transmissive third substrate facing the first outer surface, a second bonding portion configured to bond the first outer surface and the third substrate to each other, the second bonding portion sealing a second inner space between the first substrate and the third substrate, a transmissive fourth substrate facing the second outer surface, and a third bonding portion configured to bond the second outer surface and the fourth substrate to each other, the third bonding portion sealing a third inner space between the second substrate and the fourth substrate, wherein the first inner space, the second inner space, and the third inner space are lower in pressure than atmospheric pressure.

In the interference filter according to the present aspect, the second bonding portion bonds the first substrate and the third substrate, by a first metal layer provided at the first outer surface, and a third metal layer provided at a third facing surface of the third substrate facing the first substrate being metal-bonded, and the third bonding portion bonds the second substrate and the fourth substrate, by a second metal layer provided at the second outer surface, and a fourth metal layer provided at a fourth facing surface of the fourth substrate facing the second substrate being metal-bonded.

In the interference filter according to the present aspect, the first bonding portion bonds the first substrate and the second substrate by an elastic layer having an elastic modulus smaller than that of a metal film.

In the interference filter according to the present aspect, the elastic layer is a plasma polymerized film having a siloxane as a main component.

A method of manufacturing an interference filter according to a second aspect of the present disclosure includes performing a first substrate forming step for forming a first reflection film at a first inner surface of a transmissive first substrate including the first inner surface and a first outer surface facing each other, a second substrate forming step for forming a second reflection film at a second inner surface of a transmissive second substrate including the second inner surface and a second outer surface facing each other, a first bonding step for bonding the first inner surface and the second inner surface to each other by a first bonding portion and sealing a first inner space between the first substrate and the second substrate, in a reduced pressure environment with a pressure lower than atmospheric pressure, a second bonding step for bonding the first outer surface and a transmissive third substrate to each other by a second bonding portion and sealing a second inner space between the first substrate and the third substrate, in a reduced pressure environment with a pressure lower than atmospheric pressure, and a third bonding step for bonding the second outer surface and a transmissive fourth substrate to each other by a third bonding portion and sealing a third inner space between the second substrate and the fourth substrate, in a reduced pressure environment with a pressure lower than atmospheric pressure.

The method of manufacturing an interference filter of the present aspect includes a first masking step for covering the first reflection film with a first mask, a first elastic layer forming step for forming, at the first inner surface, a first elastic layer that is a plasma polymerized film having a siloxane as a main component, and removing the first mask, a second masking step for covering the second reflection film with a second mask, and a second elastic layer forming step for forming, at the second inner surface, a second elastic layer that is a plasma polymerized film having a siloxane as a main component, and removing the second mask, wherein the first bonding step includes forming the first bonding portion in which the first elastic layer at the first inner surface and the second elastic layer at the second inner surface are bonded to each other to bond the first substrate and the second substrate to each other, in a reduced pressure environment with a pressure lower than atmospheric pressure.

The method of manufacturing an interference filter of the present aspect includes a first metal forming step for forming a first metal layer at the first outer surface, a third metal forming step for forming a third metal layer at a third facing surface of the third substrate facing the first substrate, a second metal forming step for forming a second metal layer at the second outer surface, and a fourth metal forming step for forming a fourth metal layer at a fourth facing surface of the fourth substrate facing the second substrate, wherein the second bonding step includes applying a load in a direction in which the first substrate and the third substrate come close to each other to form the second bonding portion in which the first metal layer and the third metal layer are metal-bonded, thereby bonding the first substrate and the third substrate, and the third bonding step includes applying a load in a direction in which the second substrate and the fourth substrate come close to each other to form the third bonding portion in which the second metal layer and the fourth metal layer are metal-bonded, thereby bonding the second substrate and the fourth substrate.

In the method of manufacturing an interference filter of the present aspect, the second substrate forming step includes a second substrate etching step for etching the second outer surface to form a movable portion having a predetermined thickness, and a diaphragm portion thinner than the movable portion, and a second reflection film forming step for forming the second reflection film at the second inner surface of the movable portion, and the third bonding step is performed before the second bonding step.

DESCRIPTION OF EXEMPLARY EMBODIMENTS

An exemplary embodiment according to the present disclosure will be described below with reference to the figures.
Configuration of Spectroscopy Measurement Device FIG. 1 is a diagram illustrating a schematic configuration of a spectroscopy measurement device according to the present exemplary embodiment.

A spectroscopy measurement device 1 is an example of an electronic device in which an interference filter of the present disclosure is mounted, and is a device that analyzes light intensity of each wavelength in measurement target light reflected by a measurement target X, and measures an optical spectrum. Note that, in the present exemplary embodiment, an example will be illustrated in which measurement target light reflected by the measurement target X is measured, but when a light-emitting body such as a liquid crystal panel is used as the measurement target X, light emitted from the light-emitting body may be used as the measurement target light. Also, as an example of an electronic device, the spectroscopy measurement device 1 is illustrated, but the present disclosure is not limited thereto, and the interference filter of the present disclosure can be applied to, for example, a spectroscopic camera or a light source device.

Figure 1:
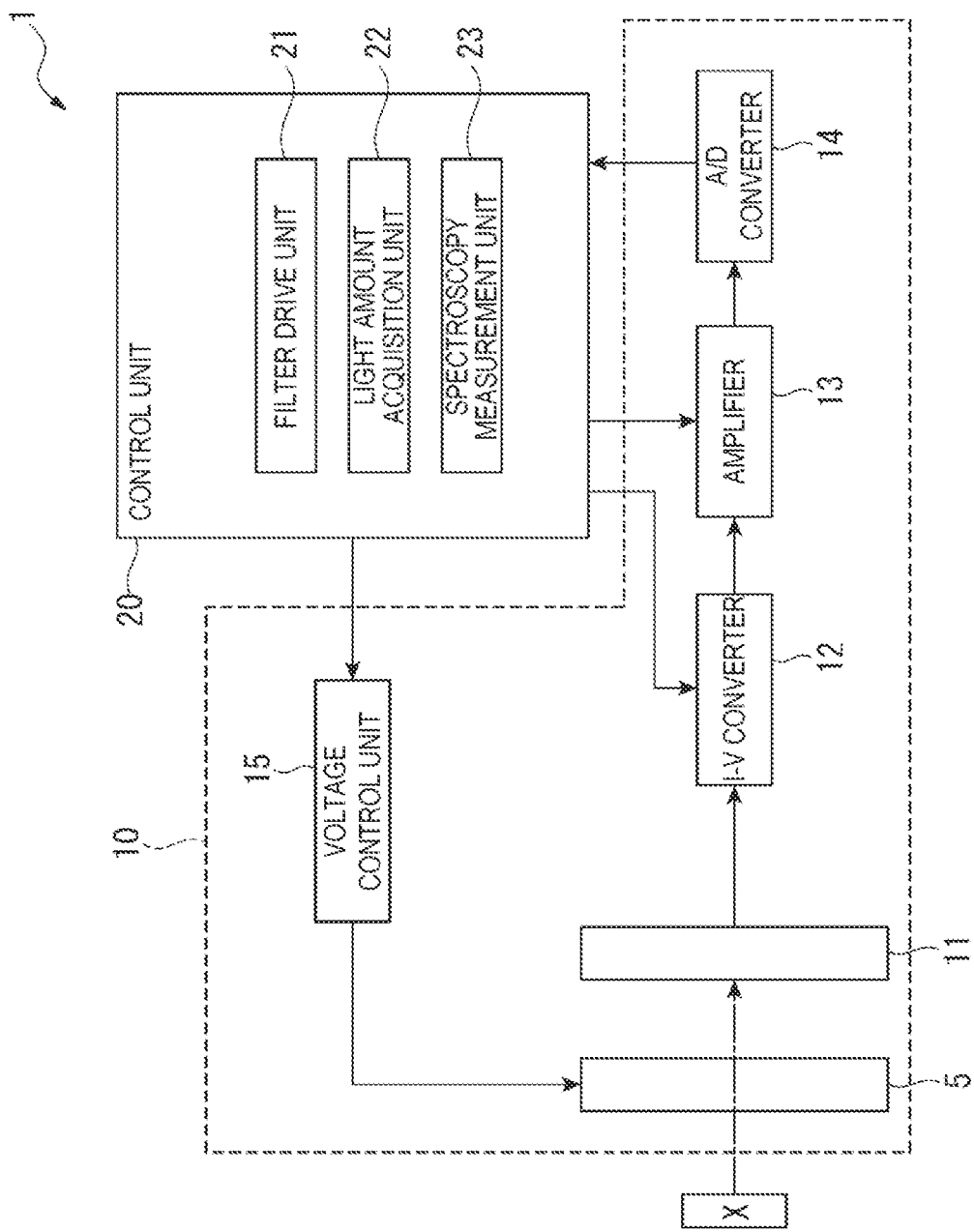
FIG. 1 is a diagram illustrating a schematic configuration of a spectroscopy measurement device according to an exemplary embodiment of the present disclosure.

As illustrated in FIG. 1, the spectroscopy measurement device 1 of the present exemplary embodiment includes an optical module 10, and a control unit 20 that processes a signal output from the optical module 10.
Configuration of Optical Module The optical module 10 includes an interference filter 5, a detector 11, an I-V converter 12, an amplifier 13, an A/D converter 14, and a voltage control unit 15.

The optical module 10 guides measurement target light reflected by the measurement target X to the interference filter 5 via an incident optical system (not illustrated), and receives light output from the interference filter 5 by the detector 11. Then, a detection signal output from the detector 11 is output to the control unit 20 via the I-V converter 12, the amplifier 13, and the A/D converter 14.
Configuration of Interference Filter Next, the interference filter 5 incorporated into the optical module 10 will be described.

Figure 2:
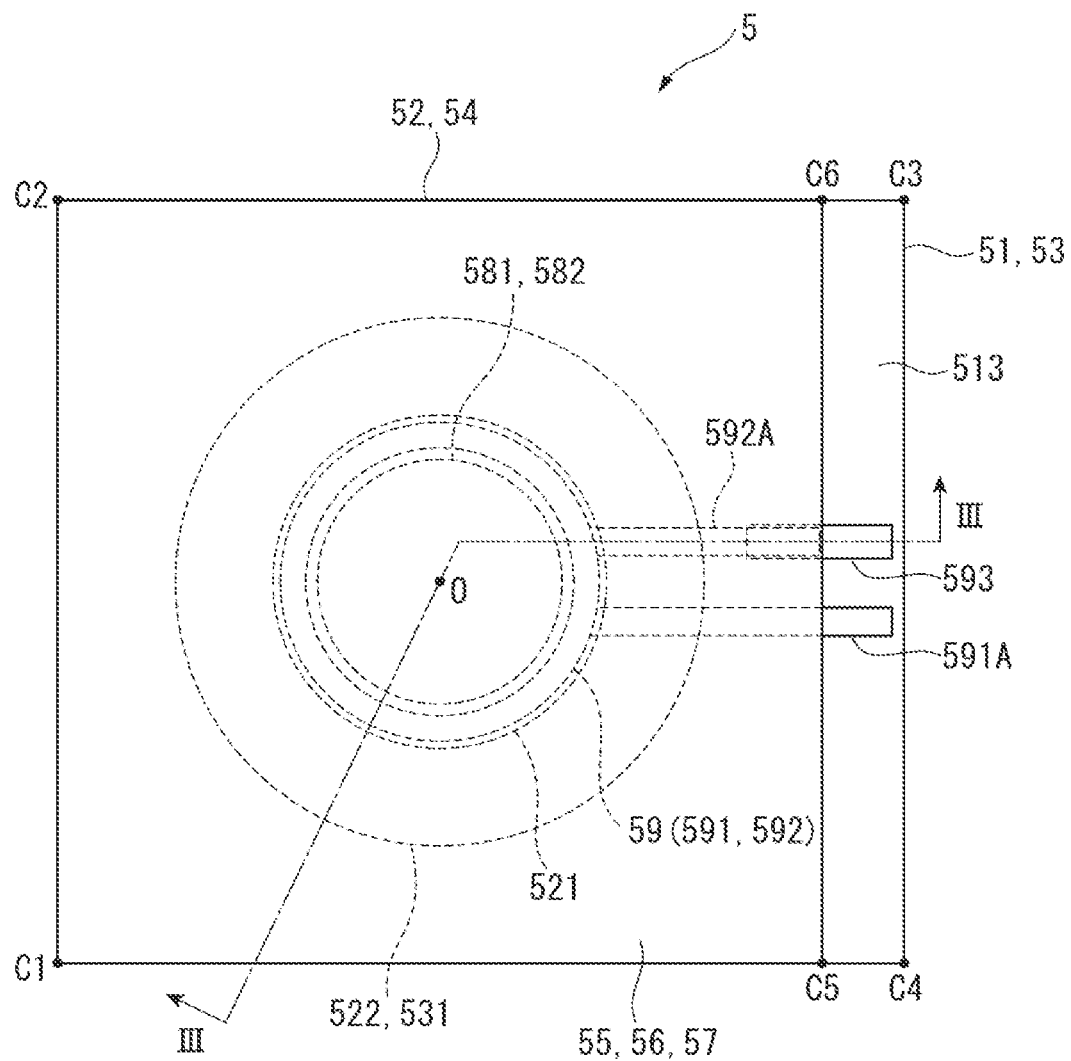
FIG. 2 is a plan view illustrating a schematic configuration of an interference filter of the present exemplary embodiment.
Figure 3:
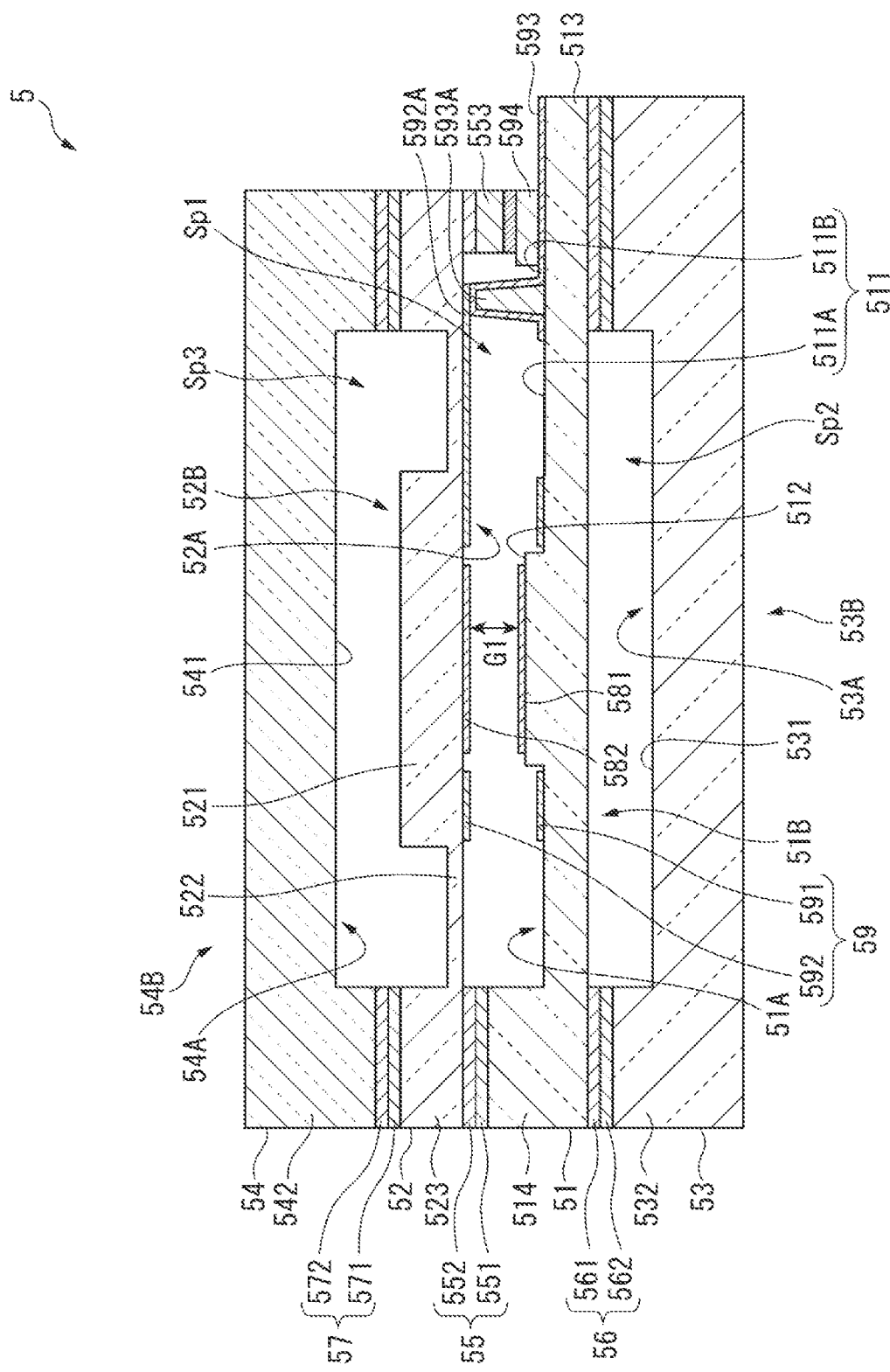
FIG. 3 is a cross-sectional view taken along a line III-III in FIG. 2.

FIG. 2 is a plan view illustrating a schematic configuration of the interference filter 5. FIG. 3 is a cross-sectional view taken along the line III-III in FIG. 2.

As illustrated in FIG. 2 and FIG. 3, the interference filter 5 is configured by stacking and bonding four substrates of a first substrate 51, a second substrate 52, a third substrate 53, and a fourth substrate 54. Each of these substrates 51, 52, 53, and 54 is a transmissive substrate, and for example, when a wavelength of light dispersed by the interference filter is in a visible light range, soda glass, crystalline glass, quartz glass, or the like can be used, and when the wavelength is in a near-infrared region or an infrared region, silicon or the like may be used. That is, the substrates 51, 52, 53, and 54 are each formed of a substrate capable of transmitting light that is dispersed by the interference filter 5.

More specifically, the first substrate 51 includes a first inner surface 51A and a first outer surface 51B facing each other. That is, in the first substrate 51, the first inner surface 51A and the first outer surface 51B are front and back sides, respectively. The second substrate 52 includes the first inner surface 51A and the first outer surface 51B facing each other. That is, in the second substrate 52, a second inner surface 52A and a second outer surface 52B are front and back sides, respectively. The first substrate 51 and the second substrate 52 are disposed such that the first inner surface 51A and the second inner surface 52A facing each other, and are bonded by a first bonding portion 55.

The third substrate 53 has a third inner surface 53A and a third outer surface 53B that are front and back sides, respectively, and the fourth substrate 54 has a fourth inner surface 54A and a fourth outer surface 54B that are front and back sides, respectively.

The third inner surface 53A of the third substrate 53 corresponds to a third facing surface in the present disclosure, faces the first outer surface 51B of the first substrate 51, and is bonded to the first outer surface 51B by a second bonding portion 56. The fourth inner surface 54A of the fourth substrate 54 corresponds to a fourth facing surface in the present disclosure, faces the second outer surface 52B of the second substrate 52, and is bonded to the second outer surface 52B by a third bonding portion 57. A detailed description of the configurations of the respective bonding portions 55, 56, and 57 will be described later.

Additionally, the first inner surface 51A of the first substrate 51 is provided with a first reflection film 581, and the second inner surface 52A of the second substrate 52 is provided with a second reflection film 582. These first reflection film 581 and second reflection film 582 are disposed facing each other via a gap G1. Then, in plan view when viewed from a thickness direction of the first substrate 51 and the second substrate 52, an optical interference region is configured with a region where these first reflection film 581 and second reflection film 582 overlap.

The interference filter 5 is provided with a gap change portion used to adjust a dimension of the gap G1. A configuration of the gap change portion is not particularly limited, but in the present exemplary embodiment, an electrostatic actuator 59 is illustrated as the gap change portion.

By applying a predetermined voltage between opposed electrodes, such an electrostatic actuator 59 can easily change the dimension of the gap G1 due to electrostatic attraction, and thus the configuration can be simplified. The electrostatic actuator 59 can be driven by control by the voltage control unit 15.

Note that, in the following description, a plan view of each of the substrates 51, 52, 53, and 54 as viewed from a substrate thickness direction, that is, a plan view of the interference filter 5 as viewed from a stack direction of the third substrate 53, the first substrate 51, the second substrate 52, and the fourth substrate 54 is referred to as a plan view of the filter. In addition, in the present exemplary embodiment, in plan view of the filter, a center point of the first reflection film 581 and a center point of the second reflection film 582 match, and the center point of these reflection films in plan view of the filter is referred to as a filter center point O, and a straight line passing through the center point of these reflection films is referred to as a central axis.

Hereinafter, the configuration of each of the substrates 51, 52, 53, and 54 will be described in further detail.

Configuration of First Substrate 51

Figure 4:
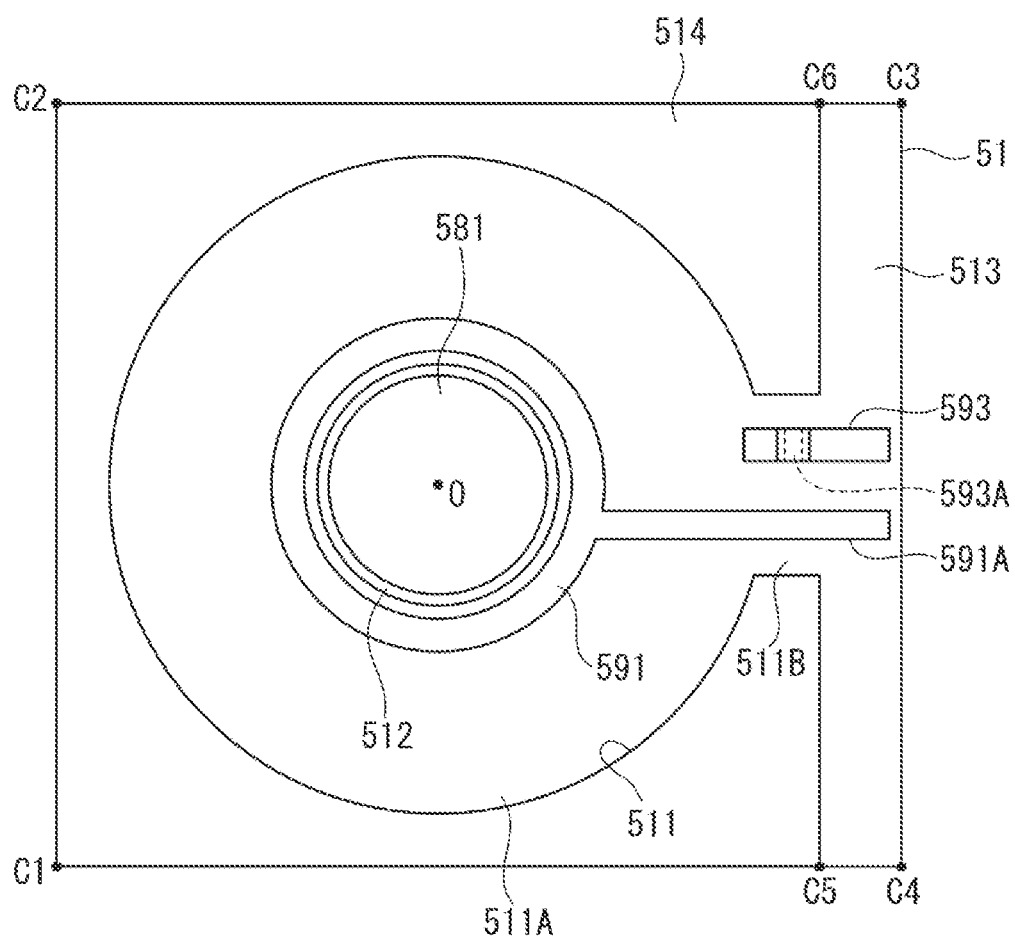
FIG. 4 is a plan view of a first substrate of the present exemplary embodiment as viewed from a second substrate side.

FIG. 4 is a plan view of the first substrate 51 of the present exemplary embodiment as viewed from the second substrate 52 side.

The first substrate 51 is formed to have a large thickness dimension with respect to the second substrate 52, and there is no flexure of the first substrate 51 due to electrostatic attraction by the electrostatic actuator 59, or an inner stress of a membrane member (for example, the first reflection film 581, or the like) formed at the first substrate 51.

As illustrated in FIG. 3 and FIG. 4, the first substrate 51 includes an electrode disposition groove 511, and a reflection film installation portion 512, formed by etching or the like. Additionally, one end portion (side C3-C4) of the first substrate 51 protrudes outward from an outer peripheral edge (side C5-C6) of the second substrate 52 and the fourth substrate 54 in plan view of the filter, and a terminal portion 513 is formed of the protruding portion.

The electrode disposition groove 511 includes, for example, an annular portion 511A formed in an annular shape centered on the filter center point O of the first substrate 51 in plan view of the filter, and an extraction portion 511B that is continuous from the annular portion 511A toward a substrate outer edge.

In the example illustrated in FIG. 4, the shape of the annular portion 511A in plan view of the filter is substantially circular, but may have a rectangular frame shape, or may have a polygonal shape.

The extraction portion 511B extends from the annular portion 511A to the terminal portion 513 of the side C3-C4 of the first substrate 51.

Also, the terminal portion 513 is formed at the same plane as a groove bottom surface of the electrode disposition groove 511.

At the groove bottom surface of the electrode disposition groove 511, a first electrode 591 constituting the electrostatic actuator 59 is disposed. The first electrode 591 may be provided directly at the groove bottom surface of the electrode disposition groove 511, or another thin film layer may be provided at the groove bottom surface, and the first electrode 591 may be installed thereat.

The first electrode 591 is formed in a substantially annular shape, and may be formed in a toric shape. Note that, the substantially annular shape described here includes, for example, a shape having a partial cutout, such as a C-shape. In addition, in the present exemplary embodiment, although the example in which one first electrode 591 is provided is illustrated, for example, a plurality of toric electrodes may be disposed concentrically, and the plurality of electrodes may be each configured independently (insulated).

Then, a first extraction electrode 591A is coupled to the first electrode 591, and the first extraction electrode 591A is extracted from the annular portion 511A to the terminal portion 513 through the extraction portion 511B, and is electrically coupled to the voltage control unit 15 by wire bonding or FPC, for example, in the terminal portion 513.

Examples of a material forming such first electrode 591 and first extraction electrode 591A include an Au/Cr film, ITO (Indium Tin Oxide), and the like. Also, an insulating film may be formed at a front surface of the first electrode 591.

Furthermore, with resin such as polyimide as a core 593A, a bump electrode 593 obtained by plating around the core with Au or the like is formed at the extraction portion 511B. The bump electrode 593 is extracted along the extraction portion 511B to the terminal portion 513, and is electrically coupled to the voltage control unit 15 by, for example, wire bonding, FPC, or the like. Note that, the bump electrode 593 and the first extraction electrode 591A are in an insulating relationship with each other without contact.

The reflection film installation portion 512 is disposed on a center side of the electrode disposition groove 511 in plan view of the filter, and is formed protruding toward the second substrate 52, for example. The first reflection film 581 is disposed at a projecting tip surface of the reflection film installation portion 512. Note that, in the present exemplary embodiment, the configuration is illustrated in which the reflection film installation portion 512 protrudes toward the second substrate 52 from the groove bottom surface of the electrode disposition groove 511, but the present disclosure is not limited thereto. For example, the reflection film installation portion 512 may be formed in a concave shape, and a bottom surface of the reflection film installation portion 512 may be positioned farther from the second substrate 52 than the groove bottom surface of the electrode disposition groove 511, and the first reflection film 581 may be provided at the bottom surface. Alternatively, the reflection film installation portion 512 may be flush with the groove bottom surface of the electrode disposition groove 511.

The first reflection film 581 installed at the reflection film installation portion 512 may be provided directly at the reflection film installation portion 512, or another thin film (layer) may be provided at the reflection film installation portion 512, and the first reflection film 581 may be provided thereat. As the first reflection film 581, a metal film of Ag or the like, or a conductive alloy film of an Ag alloy or the like, can be used. When a metal film of Ag or the like is used, a protective film may be formed in order to suppress deterioration of Ag.

Also, for example, a high refractive index layer is made of $TiO_2$, a low refractive index layer is made of $SiO_2$, and a dielectric multilayer film formed by alternately stacking the high refractive index layer and the low refractive index layer may be used, or a reflection film formed by stacking a dielectric multilayer film and a metal film, or a reflection film formed by stacking a dielectric monolayer film and an alloy film, or the like may be used.

The first reflection film 581 faces the second reflection film 582 of the second substrate 52 via the gap G1. Here, in the present exemplary embodiment, an example in which the gap G1 of the reflection films 581 and 582 is smaller than a gap of the first electrode 591 and a second electrode 592 constituting the electrostatic actuator 59 is illustrated, but the present disclosure is not limited thereto. For example, when an infrared ray or a far infrared ray is used as measurement target light, a configuration may be adopted in which the gap G1 is larger than the gap between the electrodes 591 and 592 depending on a wavelength range of the measurement target light. In this case, as described above, the reflection film installation portion 512 of the first substrate 51 is formed in a concave shape.

In plan view of the filter, a region other than the electrode disposition groove 511, the reflection film installation portion 512, and the terminal portion 513 is a first bonding target portion 514.

The first inner surface 51A in the first bonding target portion 514, that is, a surface facing the second substrate 52, is bonded to the second substrate 52 by the first bonding portion 55. The first outer surface 51B in the first bonding target portion 514, that is, a surface facing the third substrate 53, is bonded to the third substrate 53 by the second bonding portion 56.

The first outer surface 51B of the first substrate 51 is formed in a plane as illustrated in FIG. 3, and is parallel to the first reflection film 581. Note that, in the first outer surface 51B, an anti-reflective film (not illustrated) may be provided in a region overlapping the first reflection film 581 in plan view of the filter. When such an anti-reflective film is provided, light reflectance at a front surface of the first outer surface 51B can be decreased, and transmittance can be increased.

Configuration of Second Substrate

Figure 5:
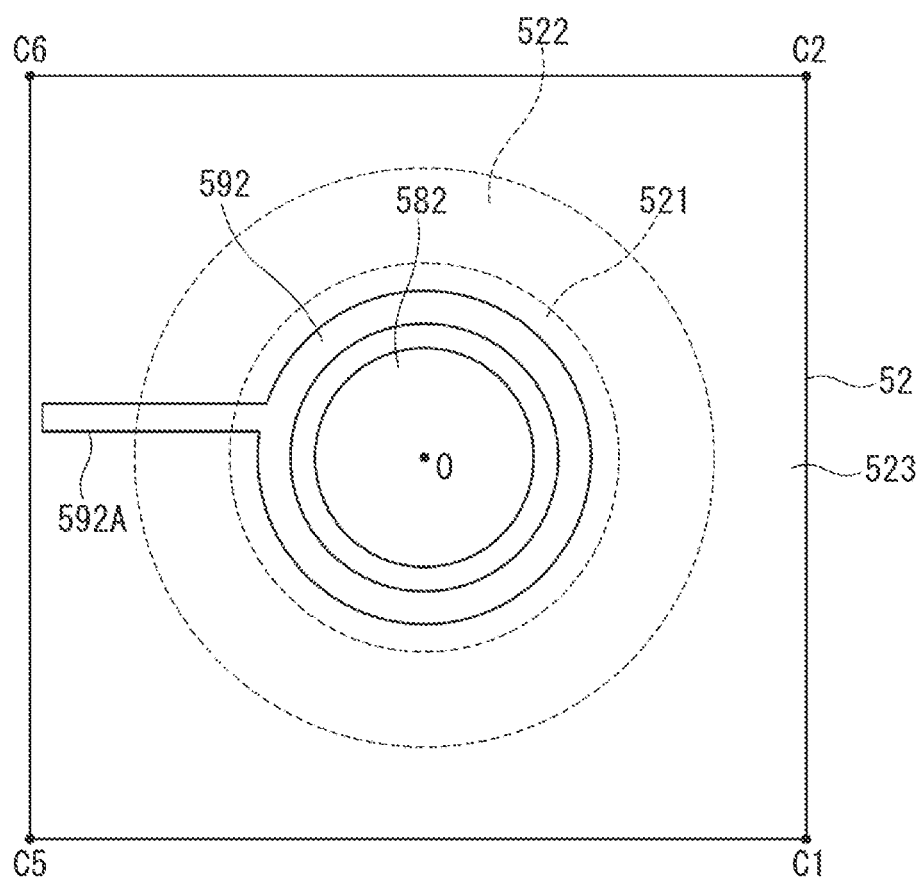
FIG. 5 is a plan view of the second substrate of the interference filter of the present exemplary embodiment as viewed from the first substrate side.

FIG. 5 is a plan view of the second substrate 52 in the interference filter 5 of the present exemplary embodiment as viewed from the first substrate 51 side.

As illustrated in FIG. 2, FIG. 3, and FIG. 5, the second substrate 52 includes a movable portion 521 having a circular shape centered on the filter center point O in plan view of the filter, a diaphragm portion 522 that is coaxial with the movable portion 521 and holds the movable portion 521, and a substrate outer peripheral portion 523 provided outside the diaphragm portion 522.

The movable portion 521 is formed to be thicker than the diaphragm portion 522, and for example, in the present exemplary embodiment, is formed to have the same dimension as a thickness of the second substrate 52 (the substrate outer peripheral portion 523). The movable portion 521 is formed to have a diameter dimension that is at least greater than a diameter dimension of an outer peripheral edge of the reflection film installation portion 512 in plan view of the filter. Then, the second reflection film 582, and the second electrode 592 that constitutes the electrostatic actuator 59 are provided on the second inner surface 52A side of the movable portion 521 facing the first substrate 51. The second reflection film 582 and the second electrode 592 may be provided directly at the second inner surface 52A, or another thin film (layer) may be provided at the second inner surface 52A, and the second reflection film 582 and the second electrode 592 may be provided thereat.

Similar to the first electrode 591, the second electrode 592 is formed in a substantially annular shape, and may be formed in a toric shape centered on the filter center point O. Additionally, similar to the first electrode 591, the second electrode 592 may be formed in a shape in which a part of a torus is cut out, such as a C-shape, for example, or may be formed of a plurality of annular electrodes. Note that, in the present exemplary embodiment, the example is illustrated in which the second electrode 592 is provided at the second inner surface 52A of the movable portion 521, but the present disclosure is not limited thereto. For example, the second electrode 592 may be provided at the second inner surface 52A of the second substrate 52 across the movable portion 521 and the diaphragm portion 522, or may be provided at the diaphragm portion 522.

A second extraction electrode 592A is coupled to the second electrode 592, and the second extraction electrode 592A is extracted along a region facing the extraction portion 511B to an outer peripheral edge of the second substrate 52. More specifically, the second extraction electrode 592A is provided facing the bump electrode 593, and is in contact with the bump electrode 593 on the core 593A. As a result, the second electrode 592 is coupled to the voltage control unit 15 via the bump electrode 593.

As a material for forming the second electrode 592 and the second extraction electrode 592A described above, similar to the first electrode 591, it is possible to use, for example, an au/Cr film, ITO (Indium Tin Oxide), and the like.

The second reflection film 582 is provided at a center part of the movable portion 521 so as to face the first reflection film 581 via the gap G1. A reflection film having the same configuration as that of the first reflection film 581 described above is used as the second reflection film 582.

The diaphragm portion 522 is a diaphragm surrounding the movable portion 521, and is formed to be thinner than the movable portion 521. Such a diaphragm portion 522 is easily flexed compared to the movable portion 521, and is capable of displacing the movable portion 521 toward the first substrate 51 by slight electrostatic attraction. At this time, since the movable portion 521 has a greater thickness dimension compared to the diaphragm portion 522, and rigidity is increased, a shape change of the movable portion 521 can be suppressed, even when the movable portion 521 is pulled toward the first substrate 51 by electrostatic attraction.

Note that, in the present exemplary embodiment, the diaphragm portion 522 having a diaphragm shape is illustrated, but the present disclosure is not limited thereto, and for example, a configuration may be adopted in which beam-shaped holding portions disposed at an equal angle interval are provided about the filter center point O of the movable portion 521.

The substrate outer peripheral portion 523 is a portion that is provided outside the diaphragm portion 522 in plan view of the filter. The second inner surface 52A of the substrate outer peripheral portion 523 is bonded to the first bonding target portion 514 of the first substrate 51 by the first bonding portion 55. The second outer surface 52B of the substrate outer peripheral portion 523 is bonded to the fourth substrate 54 by the third bonding portion 57.

Configuration of Third Substrate

The third substrate 53 is formed by processing a transmissive parallel plate substrate by etching. Specifically, the third substrate 53 includes a third substrate recessed portion 531 formed in a concave shape by etching, at a position overlapping the electrode disposition groove 511 and the reflection film installation portion 512 in plan view of the filter. A groove bottom surface of the third substrate recessed portion 531 is a flat surface, and is parallel to the first outer surface 51B and the reflection films 581 and 582.

In addition, a portion where the third substrate recessed portion 531 of the third substrate 53 is not provided is a third bonding target portion 532. The third inner surface 53A in the third bonding target portion 532, that is, a surface facing the first substrate 51 is bonded to the first bonding target portion 514 of the first substrate 51 by the second bonding portion 56.

Configuration of Fourth Substrate

The fourth substrate 54 has a shape substantially similar to that of the third substrate 53, and is formed by processing a transmissive parallel flat plate substrate by etching. Specifically, the fourth substrate 54 includes a fourth substrate recessed portion 541 formed in a concave shape by etching, at a position overlapping the movable portion 521 and the diaphragm portion 522 in plan view of the filter. A groove bottom surface of the fourth substrate recessed portion 541 is a flat surface, and is parallel to the second outer surface 52B and the reflection films 581 and 582.

In addition, a portion where the fourth substrate recessed portion 541 of the fourth substrate 54 is not provided is a fourth bonding target portion 542. The fourth inner surface 54A in the fourth bonding target portion 542, that is, a surface facing the second substrate 52, is bonded to the substrate outer peripheral portion 523 of the second substrate 52 by the third bonding portion 57.

Note that, although not illustrated, an optical film such as an anti-reflective film or a band-pass filter may be formed at the third substrate 53 or the fourth substrate 54 as described above. When an anti-reflective film is provided, reflection of light at a front surface of the third substrate 53 or the fourth substrate 54 can be suppressed. Also, by providing a band-pass filter that reflects or absorbs light having a wavelength outside a specific range, it is possible to cut light outside a measurement target in the spectroscopy measurement device 1. For example, in the spectroscopy measurement device 1 that performs a spectroscopy measurement for a visible light range, a band-pass filter that shields an infrared region and an ultraviolet region is provided. Such a band-pass filter or an anti-reflective film may be provided at either one of the third inner surface 53A, the third outer surface 53B, the fourth inner surface 54A, and the fourth outer surface 54B, or may be provided at a plurality of locations.

Configuration of First Bonding Portion

Next, the first bonding portion 55 that bonds the first substrate 51 and the second substrate 52 will be described.

As illustrated in FIG. 3, the first bonding portion 55 includes a first elastic layer 551 provided at the first inner surface 51A of the first substrate 51, and a second elastic layer 552 provided at the second inner surface 52A of the second substrate 52. Specifically, the first elastic layer 551 and the second elastic layer 552 are each a plasma polymerized film having a siloxane as a main component, and the first elastic layer 551 and the second elastic layer 552 are bonded by siloxane bonding.

By using such bonding of the substrates using the plasma polymerized films, a high degree of parallelism between the substrates can be maintained. That is, since the plasma polymerized film has elasticity as compared with a metal layer used for metal bonding, for example, even when foreign matter or the like adheres to a front surface of the plasma polymerized film, the plasma polymerize film is elastically deformed to suppress deterioration of the degree of parallelism due to the foreign matter. By such bonding using the plasma polymerized film, the high degree of parallelism between the first reflection film 581 and the second reflection film 582 is maintained, so that wavelength spectral characteristics in the interference filter 5 can be made highly accurate. That is, an inconvenience that the dimension of the gap G1 changes depending on position in an interference region is suppressed, light having a target wavelength corresponding to the gap G1 can be transmitted from each position, and an inconvenience that a wavelength half-width of emitted light spreads by output of light without a target wavelength is suppressed.

Figure 6:
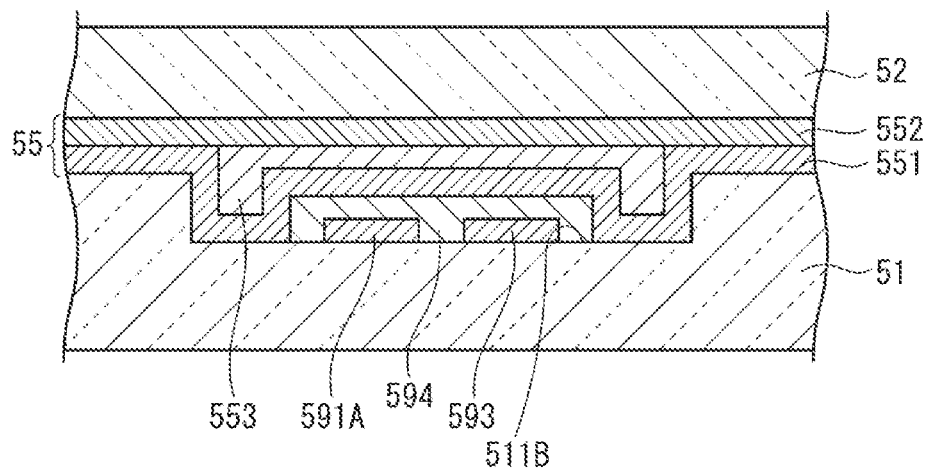
FIG. 6 is a cross-sectional view illustrating cross-sectional structure near an extraction portion.

FIG. 6 is a cross-sectional view illustrating cross-sectional structure in a vicinity of the extraction portion 511B of the interference filter 5. Note that in FIG. 6, the third substrate 53, the fourth substrate 54, the second bonding portion 56, and the third bonding portion 57 are omitted.

Incidentally, in a part where the extraction portion 511B is formed at the first substrate 51, a dimension between the first substrate 51 and the second substrate 52 is greater than a dimension between the first bonding target portion 514 and the substrate outer peripheral portion 523. Thus, the first elastic layer 551 and the second elastic layer 552 do not contact. Thus, in the present exemplary embodiment, air-tightness of this region is ensured by the configuration illustrated in FIG. 6.

That is, in the extraction portion 511B, an insulating portion 594 is provided to cover the first extraction electrode 591A and the bump electrode 593. Note that, the insulating portion 594 is not provided at a portion where the core 593A of the bump electrode 593 is provided, since electrical coupling to the second extraction electrode 592A is required.

Also, as illustrated in FIG. 3 and FIG. 6, the first elastic layer 551 and the second elastic layer 552 constituting the first bonding portion 55 are provided closer to the terminal portion 513 side than a position of the extraction portion 511B where the core 593A is provided, and the first elastic layer 551 is provided at the insulating portion 594 as illustrated in FIG. 3 and FIG. 6.

Then, the first bonding portion 55 further includes a seal portion 553 in the extraction portion 511B, and seals a space between the first elastic layer 551 and the second elastic layer 552 by the seal portion 553. As such a seal portion 553, for example, an adhesive, a low melting point glass, a low melting point metal, or the like is used, and particularly, a low melting point metal having a small amount of outgas and high airtightness may be used. Note that, the configuration is illustrated in which the seal portion 553 fills a space between the first elastic layer 551 and the second elastic layer 552 in the extraction portion 511B, but the present disclosure is not limited thereto, and for example, a configuration may be adopted in which the first elastic layer 551 in the extraction portion 511B is formed up to the same height as that of the first elastic layer 551 of the first bonding target portion 514. In this case, the extraction portion 511B can be sealed by the first elastic layer 551 and the second elastic layer 552 without providing the seal portion 553.

According to the configuration described above, airtightness of a first inner space Sp1 surrounded by the first substrate 51, the second substrate 52, and the first bonding portion 55 is maintained. Note that, the bonding of the first substrate 51 and the second substrate 52 by the first bonding portion 55 is performed in a vacuum chamber. As a result, an inside of the first inner space Sp1 is maintained in a reduced pressure environment with a pressure lower than atmospheric pressure, or may be maintained as a vacuum.

Configuration of Second Bonding Portion and Third Bonding Portion

Next, the second bonding portion 56 and the third bonding portion 57 will be described.

As illustrated in FIG. 3, the second bonding portion 56 includes a first metal layer 561 provided at the first outer surface 51B of the first substrate 51, and a third metal layer 562 provided at the third inner surface 53A of the third substrate 53, and the first metal layer 561 and the third metal layer 562 are bonded by metal bonding. For the first metal layer 561 and the third metal layer 562, for example, various metal films or alloy films made of Au, Ti, or the like, can be used, and Au may be used, which is relatively flexible among metals (highly plastic), and allows bonding with high bonding strength and high airtightness due to metal bonding.

As a result, airtightness of a second inner space Sp2 surrounded by the first substrate 51, the third substrate 53, and the second bonding portion 56 is maintained. Note that, the bonding of the first substrate 51 and the third substrate 53 by the second bonding portion 56 is performed in a vacuum chamber. As a result, an inside of the second inner space Sp2 is maintained in a reduced pressure environment with a pressure lower than atmospheric pressure, or may be maintained as a vacuum.

The third bonding portion 57 has a configuration similar to that of the second bonding portion 56, and bonds the second substrate 52 and the fourth substrate 54 by metal bonding.

In other words, the third bonding portion 57 includes a second metal layer 571 provided at the second outer surface 52B of the second substrate 52, and a fourth metal layer 572 provided at the fourth inner surface 54A of the fourth substrate 54, and the second metal layer 571 and the fourth metal layer 572 are bonded by metal bonding. For the second metal layer 571 and the fourth metal layer 572, similar to the second bonding portion 56, for example, various metal films or alloy films made of Au, Ti, or the like can be used, and Au may be used, which is relatively flexible among metals (highly plastic), and allows bonding with high bonding strength and high airtightness due to metal bonding.

As a result, airtightness of a third inner space Sp3 surrounded by the second substrate 52, the fourth substrate 54, and the third bonding portion 57 is maintained. Note that, the bonding of the second substrate 52 and the fourth substrate 54 by the third bonding portion 57 is performed in a vacuum chamber. As a result, an inside of the third inner space Sp3 is maintained as a reduced pressure environment with a pressure lower than atmospheric pressure, or may be maintained as a vacuum.

Note that, each of the first metal layer 561, the third metal layer 562, the second metal layer 571, and the fourth metal layer 572 may be formed directly at a substrate, or a foundation layer formed of resin or the like may be provided at a substrate, and the metal layer may be provided thereat.

Other Configurations of Optical Module

Next, returning to FIG. 1, other components of the optical module 10 will be described.

The detector 11 receives (detects) light transmitted through the interference filter 5, and outputs a detection signal based on an amount of received light to the I-V converter 12.

The I-V converter 12 converts the detection signal input from the detector 11 into a voltage value, and outputs the detection signal to the amplifier 13.

The amplifier 13 amplifies a voltage (detection voltage) in accordance with the detection signal input from the I-V converter 12.

The A/D converter 14 converts the detection voltage (analog signal) input from the amplifier 13 into a digital signal, and outputs the digital signal to the control unit 20.

The voltage control unit 15 applies a drive voltage to the electrostatic actuator 59 of the interference filter 5 based on control of the control unit 20. This generates electrostatic attraction between the first electrode 591 and the second electrode 592 of the electrostatic actuator 59, and the movable portion 521 is displaced toward the first substrate 51.

Configuration of Control Unit

Next, the control unit 20 of the spectroscopy measurement device 1 will be described.

The control unit 20 is configured by combining, for example, a CPU, a memory, and the like, and controls overall operation of the spectroscopy measurement device 1. As illustrated in FIG. 1, the control unit 20 includes a filter drive unit 21, a light amount acquisition unit 22, and a spectroscopy measurement unit 23. In addition, the memory of the control unit 20 stores V-A data indicating a relationship between wavelength of light transmitted through the interference filter 5, and drive voltage applied to the electrostatic actuator 59 corresponding to the wavelength.

The filter drive unit 21 sets a target wavelength of light extracted by the interference filter 5, and outputs the command signal to the voltage control unit 15 to apply a drive voltage corresponding to the set target wavelength to the electrostatic actuator 59 based on the V-A data.

The light amount acquisition unit 22 acquires an amount of light of the target wavelength transmitted through the interference filter 5, based on the amount of light acquired by the detector 11.

The spectroscopy measurement unit 23 measures spectral characteristics of measurement target light, based on the amount of light acquired by the light amount acquisition unit 22.

Method of Manufacturing Interference Filter

Next, a method of manufacturing the interference filter 5 described above will be described based on the figures.

Figure 7:
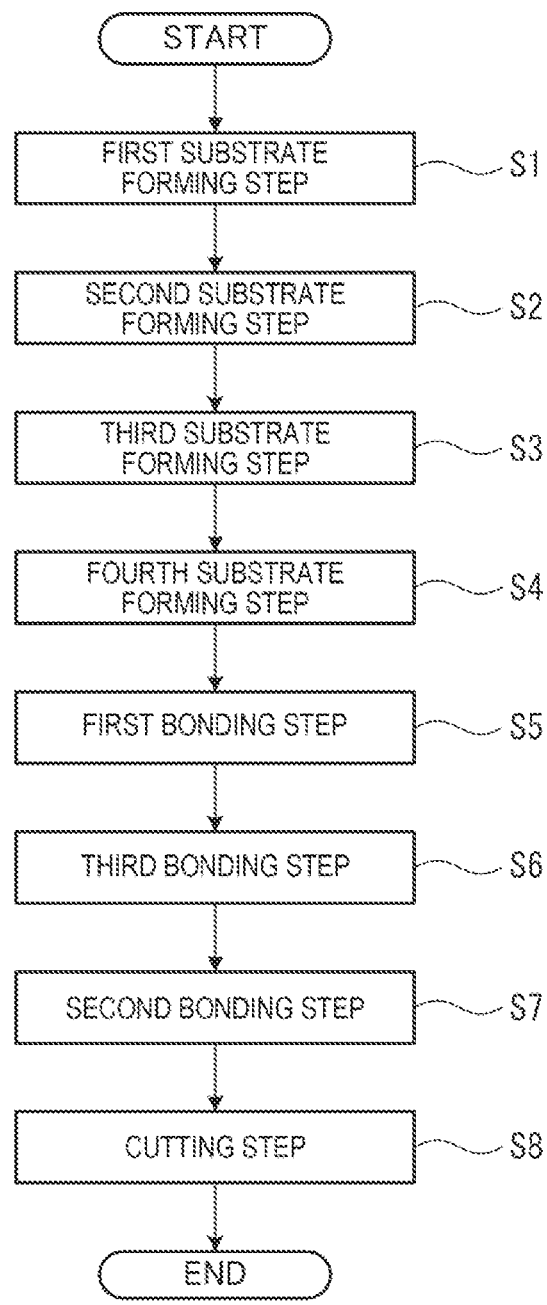
FIG. 7 is a flowchart illustrating a method of manufacturing the interference filter of the present exemplary embodiment.

FIG. 7 is a flowchart illustrating a method of manufacturing the interference filter 5.

In manufacturing of the interference filter 5, first, a first glass substrate M1 for forming the first glass substrate 51, a second glass substrate M2 for forming the second substrate 52, a third glass substrate M3 for forming the third substrate 53, and a fourth glass substrate M4 for forming the fourth substrate 54 are prepared, and a first substrate forming step S1, a second substrate forming step S2, a third substrate forming step S3, and a fourth substrate forming step S4 are performed. Note that, the step order among the first substrate forming step S1, the second substrate forming step S2, the third substrate forming step S3, and the fourth substrate forming step S4 may be switched.

After that, a first bonding step S5 for bonding the first glass substrate M1 and the second glass substrate M2 using the first bonding portion 55 is performed.

After the first bonding step S5, a third bonding step S6 for bonding the fourth glass substrate M4 to the second glass substrate M2 is performed.

Then, after the third bonding step S6, a second bonding step S7 for bonding the third glass substrate M3 to the first glass substrate M1 is performed.

Thereafter, a cutting step S8 for cutting the bonded glass substrates chip by chip is performed.

Hereinafter, each step will be described in detail.

First Substrate Forming Step

Figure 8:
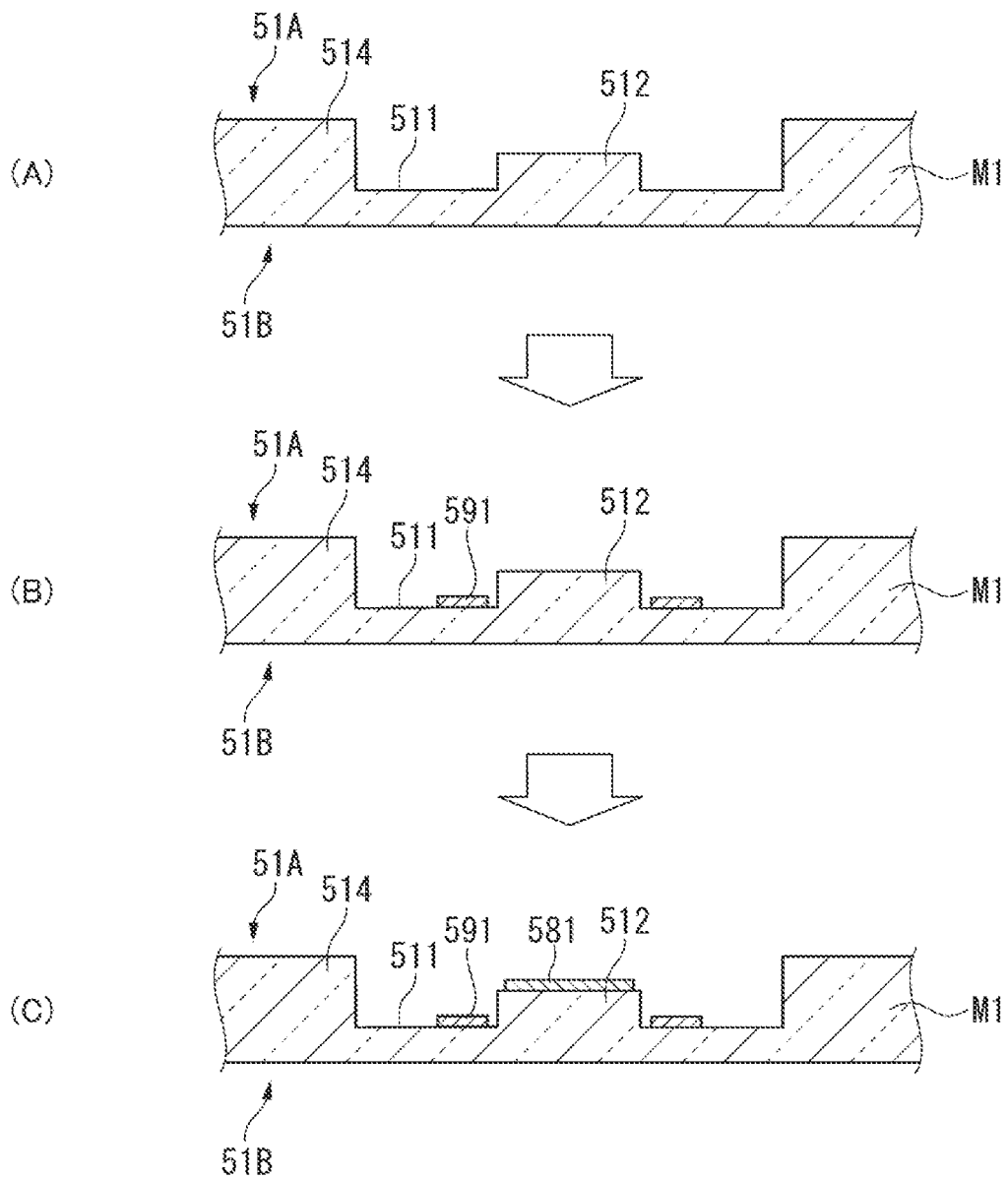
FIG. 8 is a diagram illustrating a state of a first glass substrate in a first substrate forming step.

FIG. 8 is a diagram illustrating a state of the first glass substrate M1 in the first substrate forming step S1.

In the first substrate forming step S1, first, both surfaces of the first glass substrate M1 (for example, a thickness of 1 mm), which is a manufacturing material of the first substrate 51, are precisely polished until surface roughness Ra is equal to or less than 1 nm.

Next, as illustrated in FIG. 8A, the substrate surface of the first glass substrate M1 is processed by etching.

Specifically, a resist pattern patterned by a photolithography method is used as a mask, and the first glass substrate M1 is repeatedly wet-etched using, for example, a hydrofluoric acid based solution (BHF or the like). First, the electrode disposition groove 511, the extraction portion 511B, the reflection film installation portion 512, and the terminal portion 513 are etched up to a height position of the reflection film installation portion 512. Thereafter, the electrode disposition groove 511, the extraction portion 511B, and the terminal portion 513 are formed by etching.

Note that, a surface of a front surface of the first glass substrate M1 that is not etched is the first bonding target portion 514. As a result, the first glass substrate M1 for which a substrate shape of the first substrate 51 is determined is formed.

Here, in the present exemplary embodiment, a plurality of the first substrates 51 are formed from one first glass substrate M1. Thus, in the step, the first glass substrate M1 is etched, so that the plurality of first substrates 51 are manufactured in a state of being arranged in parallel in an array.

Next, a resin layer made of polyimide or the like is formed at the first glass substrate M1, which is etched to form the core 593A. Then, an electrode material (for example, a Cr/Au layer) is formed, for forming the first electrode 591, the first extraction electrode 591A (omitted in FIG. 8, and FIG. 10 to FIG. 12 described later), and the bump electrode 593 are formed at the first inner surface 51A of the first glass substrate M1 using a vapor deposition method, a sputtering method, or the like. Then, a resist is applied to the first glass substrate M1, and the resist is patterned in accordance with a shape of each of the first electrode 591, the first extraction electrode 591A, and the bump electrode 593, using a photolithography method. Then, after the electrode material is etched with an etching solution, the resist is removed. As a result, as illustrated in FIG. 8B, the first electrode 591, the first extraction electrode 591A, and the bump electrode 593 are formed.

Thereafter, for example, an insulating film of $SiO_2$ or the like is formed at the first inner surface 51A by, for example, plasma CVD, or the like. Then, $SiO_2$ formed at the first extraction electrode 591A of the terminal portion 513, the bump electrode 593 of the terminal portion 513, and the bump electrode 593 at the core 593A is removed, for example, by dry etching or the like to form an insulating portion 594.

Next, the first reflection film 581 is formed at the reflection film installation portion 512. When a metal film of such as an Ag film or an alloy film of an Ag alloy, or the like is used as the first reflection film 581, after a metal reflection film (metal film or alloy film) is formed at the front surface of the first glass substrate M1 (first inner surface 51A), patterning is performed using a photolithography method, or the like.

Additionally, when a dielectric multilayer film is formed as the first reflection film 581, for example, patterning is performed by a lift-off process. In this case, a resist (lift-off pattern) is formed at other than a reflection film forming portion at the first glass substrate M1 by a photolithography method, or the like. Then, a material for forming the first reflection film 581 (for example, a dielectric multilayer film with a high refractive index layer of $TiO_2$, and a low refractive index layer of $SiO_2$) is formed by a sputtering method, a vapor deposition method, or the like. Then, after forming the first reflection film 581, the film of an unnecessary portion is removed by lift-off. As described above, as illustrated in FIG. 8C, the first glass substrate M1 in which the plurality of first substrates 51 are arranged in an array is formed.

Second Substrate Forming Step

Figure 9:
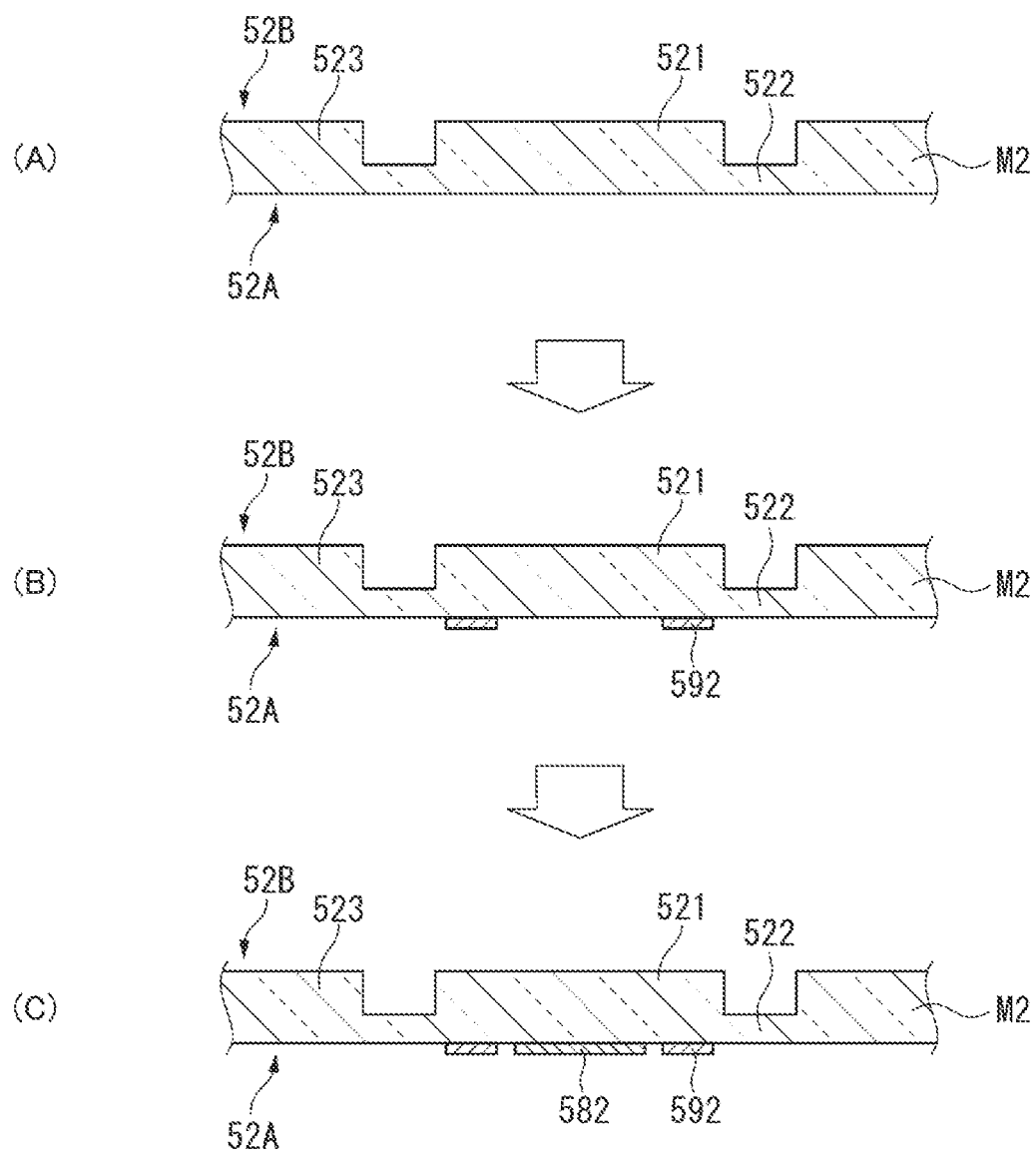
FIG. 9 is a diagram illustrating a state of a second glass substrate in a second substrate forming step.

Next, the second substrate forming step S2 will be described. FIG. 9 is a diagram illustrating a state of the second glass substrate M2 in the second substrate forming step S2.

In the second substrate forming step S2, first, both surfaces of the second glass substrate M2 are precisely polished, until the surface roughness Ra is equal to or less than 1 nm.

Then, an etching mask such as a Cr/Au layer, for example, is formed at a front surface of the second glass substrate M2, and a region corresponding to the diaphragm portion 522 is etched using, for example, a hydrofluoric acid based solution (BHF or the like) (second substrate etching step). Thereafter, as illustrated in FIG. 9A, the second glass substrate M2 is formed in which a substrate shape of the second substrate 52 is determined is manufactured by removing the Cr/Au layer used as the etching mask. Note that, similarly to the first glass substrate M1, in the present exemplary embodiment, a plurality of the second substrates 52 are formed from one second glass substrate M2. Thus, in this step, etching is performed so that the plurality of second substrates 52 are manufactured in a state of being arranged in parallel in an array at the second glass substrate M2.

Next, as illustrated in FIG. 9B, the second electrode 592 and the second extraction electrode 592A are formed. In the formation of the second electrode 592 and the second extraction electrode 592A, a method similar to that for forming the first electrode 591 at the first substrate 51 can be used.

Thereafter, as illustrated in FIG. 9C, the second reflection film 582 is formed at a center of the movable portion 521 of the second inner surface 52A (second reflection film forming step). The second reflection film 582 can be formed by a method similar to that for the first reflection film 581.

As described above, the second glass substrate M2 in which the plurality of second substrates 52 are disposed in an array is manufactured.

Third Substrate Forming Step

In the third substrate forming step S3, both surfaces of the third glass substrate are precisely polished, until the surface roughness Ra is, for example, equal to or less than 1 nm.

Figure 12:
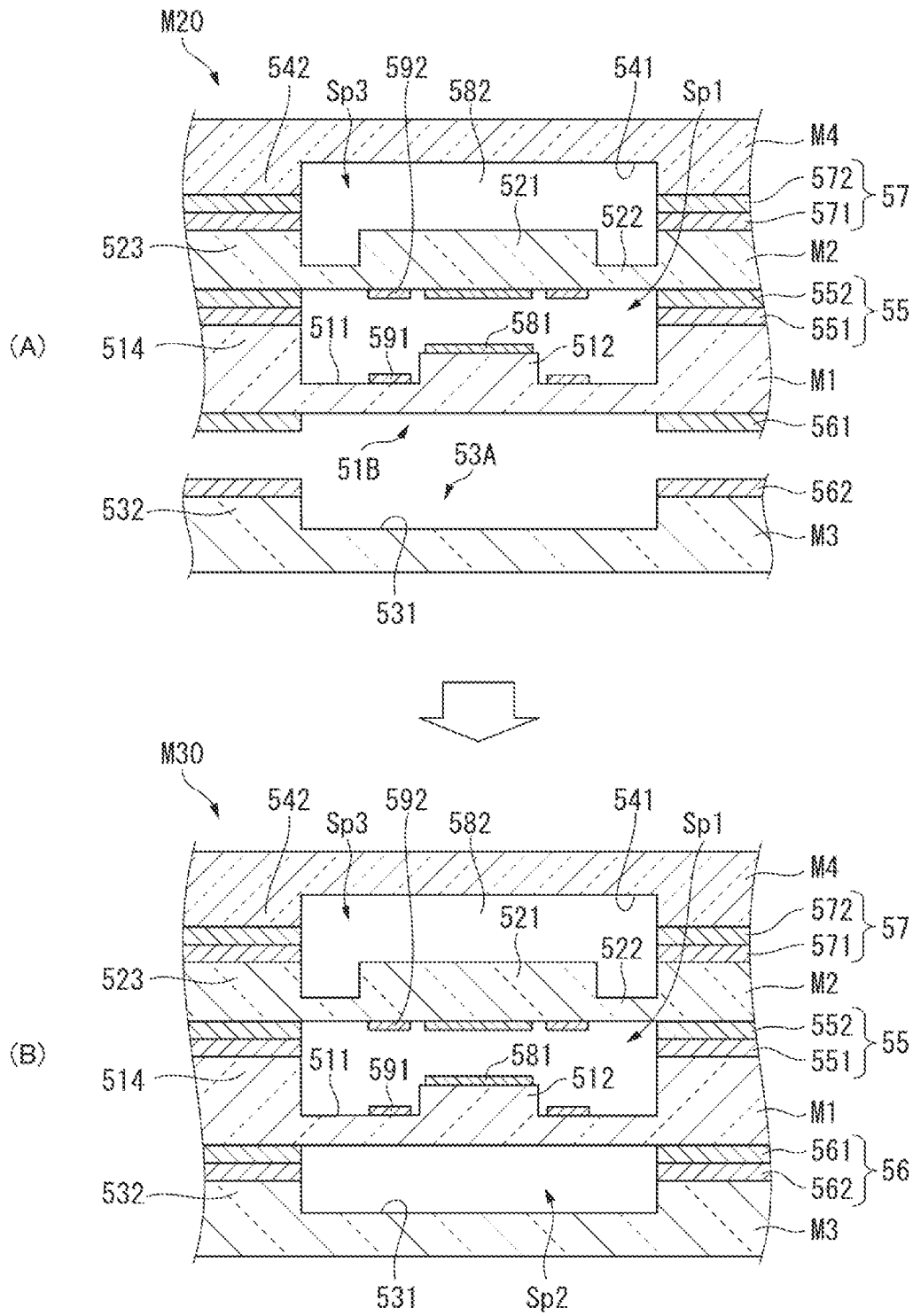
FIG. 12 is a diagram for explaining a second bonding step.

Then, the third substrate recessed portion 531 is formed by etching a predetermined position of the third glass substrate M3 (see FIG. 12). Note that, an optical film such as an anti-reflective film or a band-pass filter may be formed at the third inner surface 53A or the third outer surface 53B of the third glass substrate M3.

Fourth Substrate Forming Step

In the fourth substrate forming step S4, the fourth glass substrate M4 is formed in a procedure similar to that for the third substrate forming step S3.

That is, in the fourth substrate forming step S4, first, both surfaces are precisely polished, until the surface roughness Ra is equal to or less than 1 nm, for example. Then, the fourth substrate recessed portion 541 is formed by etching a predetermined position of the fourth glass substrate M4 (see FIG. 11). Note that, an optical film such as an anti-reflective film or a band-pass filter may be formed at the fourth inner surface 54A or the fourth outer surface 54B of the fourth glass substrate M4.

First Bonding Step

Next, the first bonding step S5 will be described.

In the first bonding step S5, first, the first elastic layer 551 is formed at the first bonding target portion 514 of the first glass substrate M1, and the second elastic layer 552 is formed at the substrate outer peripheral portion 523 of the second glass substrate M2.

Specifically, a first masking step, a second masking step, a first elastic layer forming step, and a second elastic layer forming step are performed.

Figure 10:
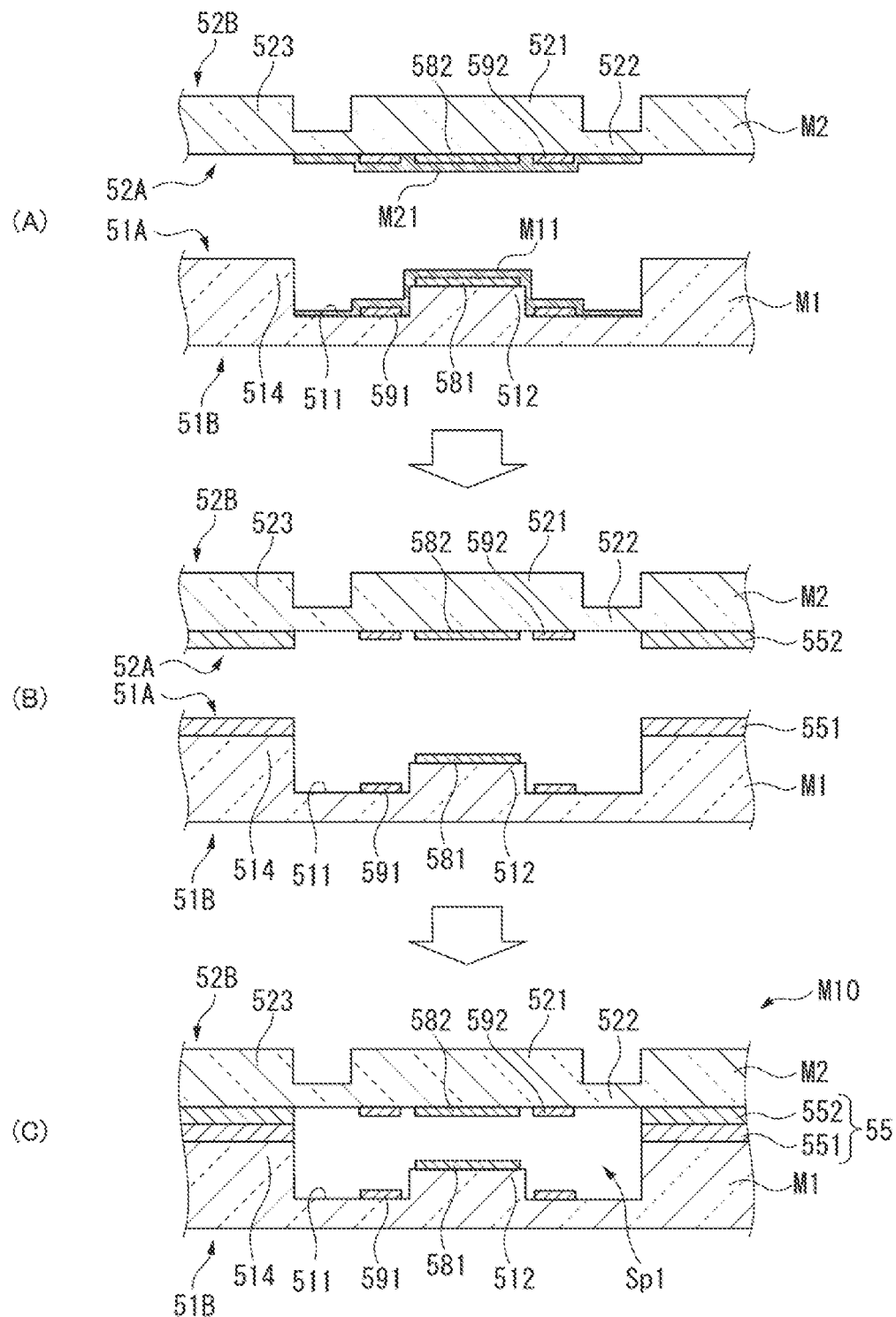
FIG. 10 is a diagram for explaining a first bonding step.

FIG. 10 is a diagram for explaining the first bonding step S5.

In the first masking step, as illustrated in FIG. 10A, a first mask M11 covering other than the first bonding target portion 514 is formed at the first inner surface 51A of the first glass substrate M1. The first mask M11 of the present exemplary embodiment is a layer for patterning the first elastic layer 551, which is a plasma polymerized film, with a lift-off process, and for example, a metal film or the like can be used. In other exemplary embodiments, a metal mask including a partial opening that exposes the first bonding target portion 514 can be applied to a substrate to form a plasma polymerized film by a CVD (Chemical Vapor Deposition) method.

The second masking step is substantially similar to the first masking step, and as illustrated in FIG. 10A, a second mask M21 covering other than the substrate outer peripheral portion 523 is formed at the second inner surface 52A of the second glass substrate M2.

Next, the first elastic layer forming step and the second elastic layer forming step are performed.

Specifically, in the first elastic layer forming step, the first glass substrate M1 is placed in a vacuum chamber of a plasma device for forming a plasma polymerized film, and a gasified monomer is poured at a predetermined flow rate to perform a plasma discharge. In the present exemplary embodiment, for example, a hexamethyldisiloxane monomer is used, whereby a plasma polymerized film having siloxane as a main component can be formed. At this time, since the first reflection film 581 is covered with the first mask M11, and is not exposed to the plasma discharge, the first reflection film 581 can be prevented from being modified. Thereafter, a lift-off process is performed to remove the first mask M11. Thus, as illustrated in FIG. 10B, the first elastic layer 551 of the plasma polymerized film can be patterned.

The second elastic layer forming step is also substantially similar to the first elastic layer forming step, and the second glass substrate M2 is placed in the vacuum chamber of the plasma device, and a gasified monomer is poured at a predetermined flow rate to perform a plasma discharge. As a result, the second elastic layer 552 formed of a plasma polymerized film having a siloxane as a main component is formed. Since the second reflection film 582 is covered with the second mask M21, and is not exposed to the plasma discharge, the second reflection film 582 can be prevented from being modified. After that, a lift-off process is performed to pattern the second elastic layer 552 of the plasma polymerized film. Thus, as illustrated in FIG. 10B, the second elastic layer 552 of the plasma polymerized film can be patterned.

Note that, in the present exemplary embodiment, the lift-off process performed in the first elastic layer forming step or the second elastic layer forming step can be performed at ambient temperature, by taking out the first glass substrate M1 or the second glass substrate M2 from the vacuum chamber.

That is, if the first substrate 51 and the second substrate 52 are bonded by metal bonding, a metal bonding layer formed at the first substrate 51 and a metal bonding layer formed at the second substrate 52 are to be activated by a plasma process or the like, and the metal bonding layers are brought into close contact with each other and metal-bonded. However, in this case, it is necessary to perform a series of steps in the vacuum chamber. Therefore, during the plasma activation process for activating the metal bonding layers, the first reflection film 581 or the second reflection film 582 cannot be covered with a mask, and the first reflection film 581 or the second reflection film 582 may be modified.

Alternatively, it is necessary to select a reflection film material having resistance to a surface process such as a plasma activation process, and thus a film material of the first reflection film 581 or the second reflection film 582 is limited.

In contrast, in the present exemplary embodiment, the first elastic layer 551 and the second elastic layer 552 constituting the first bonding portion 55 are the plasma polymerized films, and after the first elastic layer 551 and the second elastic layer 552 are formed, the first glass substrate M1 and the second glass substrate M2 can be taken out from the vacuum chamber. That is, since the masks M11 and M21 can be removed later by the lift-off process, the first reflection film 581 and the second reflection film 582 can be covered and protected with the mask M11 and M21, respectively, when the plasma polymerized films are formed.

After the above, the first glass substrate M1 and the second glass substrate M2 are placed in the vacuum chamber where an inner pressure is reduced compared to atmospheric pressure. Then, a load is applied in a direction in which the first glass substrate M1 and the second glass substrate M2 come close to each other, and the first elastic layer 551 and the second elastic layer 552 are bonded by siloxane bonding. Here, the first elastic layer 551 and the second elastic layer 552 are formed of the plasma polymerized films, and an elastic modulus is small compared to a metal film. Thus, even when foreign matter is attached to the front surface of the first elastic layer 551 or the second elastic layer 552, the first elastic layer 551 or the second elastic layer 552 can be elastically deformed, and a high degree of parallelism of the first reflection film 581 and the second reflection film 582 can be maintained.

As a result, as illustrated in FIG. 10C, a first bonded body M10 can be formed in which the first glass substrate M1 and the second glass substrate M2 are bonded by the first bonding portion 55.

Third Bonding Step

Next, the third bonding step S6 will be described.

Figure 11:
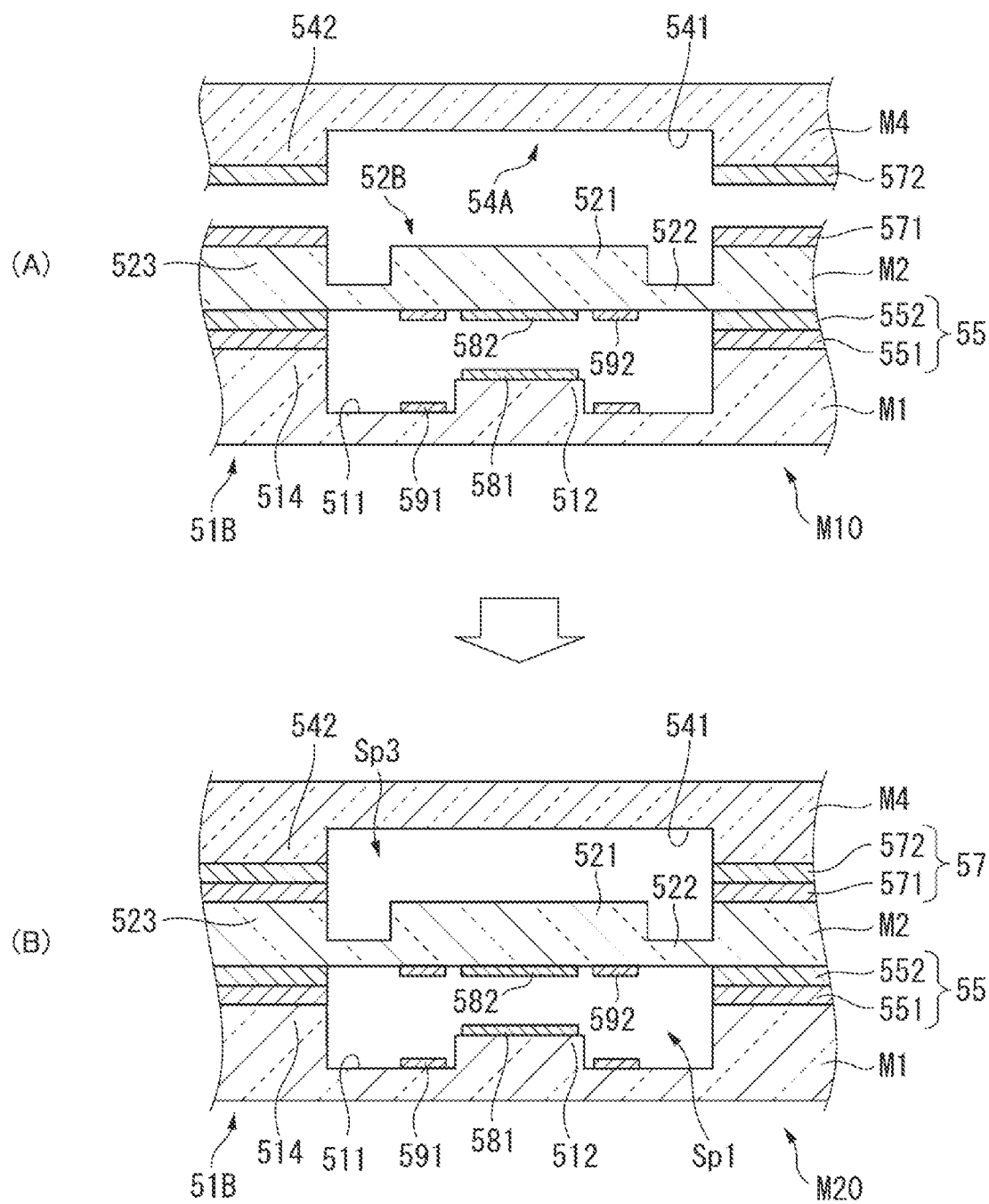
FIG. 11 is a diagram for explaining a third bonding step.

FIG. 11 is a diagram for explaining the third bonding step S6.

In the third bonding step S6, first, as illustrated in FIG. 11A, the second metal layer 571 is formed at the second outer surface 52B of the substrate outer peripheral portion 523 of the second glass substrate M2 (second metal forming step), and the fourth metal layer 572 is formed at a position of the fourth inner surface 54A of the fourth glass substrate M4 facing the substrate outer peripheral portion 523 (fourth metal forming step). As described above, Au may be used for the second metal layer 571 and the fourth metal layer 572.

Additionally, in order to maintain a pressure between the first substrate 51 and the second substrate 52 to be in a reduced state, the second metal layer 571 may be formed while the first bonded body M10, which is a bonded body of the first glass substrate M1 and the second glass substrate M2 bonded by the first bonding step S5, is placed in the vacuum chamber under a reduced pressure environment with a pressure lower than atmospheric pressure.

Next, the fourth glass substrate M4 is placed in the vacuum chamber containing the first bonded body M10, and a plasma activation process is performed on respective front surfaces of the second metal layer 571 and the fourth metal layer 572. Thereafter, a load is applied in a direction in which the first bonded body M10 and the fourth glass substrate M4 come close to each other, and the second metal layer 571 and the fourth metal layer 572 are bonded by metal bonding to form the third bonding portion 57. For example, the first bonded body M10 and the fourth glass substrate M4 are sandwiched and pressed by a clamping device including a pair of flat plate members. At this time, pressing force by the clamping device does not directly act on the movable portion 521 formed at the second glass substrate M2, and thus damage or distortion of the movable portion 521 can be suppressed.

Furthermore, a configuration may be adopted in which, a heater is provided at the flat plate member on the fourth glass substrate M4 side of the clamping device, and the second metal layer 571 and the fourth metal layer 572 are heated.

As illustrated in FIG. 11B, the first bonded body M10 and the fourth glass substrate M4 are bonded by the third bonding portion 57. As a result, the third inner space Sp3 surrounded by each second substrate 52 provided at the second glass substrate M2, each fourth substrate 54 provided at the fourth glass substrate M4, and the third bonding portion 57 is maintained in a reduced pressure environment with a pressure lower than atmospheric pressure, and hermetically sealed.

Second Bonding Step

After the third bonding step S6, the second bonding step S7 is performed.

FIG. 12 is a diagram for explaining the second bonding step S7.

The second bonding step S7 can be performed by a technique substantially similar to that for the third bonding step S6.

That is, in the second bonding step S7, first, as illustrated in FIG. 12A, the first metal layer 561 is formed at the first outer surface 51B of the first bonding target portion 514 of the first glass substrate M1 (first metal forming step), and the third metal layer 562 is formed at a position of the third inner surface 53A of the third glass substrate M3 facing the first bonding target portion 514 (third metal forming step). As described above, Au may be used for the first metal layer 561 and the third metal layer 562.

Note that, in order to maintain a pressure between the first substrate 51 and the second substrate 52 to be in a reduced state, the first metal layer 561 may be formed while a second bonded body M20, which is a bonded body of the first bonded body M10 and the fourth glass substrate M4 bonded by the third bonding step S6, is placed in the vacuum chamber under a reduced pressure environment with a pressure lower than atmospheric pressure.

Then, the third glass substrate M3 is placed in the vacuum chamber, and a load is applied in a direction in which the second bonded body M20 and the third glass substrate M3 come close to each other, and the first metal layer 561 and the third metal layer 562 are bonded by metal bonding to form the second bonding portion 56. For example, the second bonded body M20 and the third glass substrate M3 are sandwiched and pressed by a clamping device including a pair of flat plate members. At this time, since the fourth glass substrate M4 is bonded to the second glass substrate M2 by the third bonding step S6, pressing force by the clamping device does not directly act on the movable portion 521 of the second glass substrate M2, and damage or distortion of the movable portion 521 can be suppressed.

Furthermore, a configuration may be adopted in which, a heater is provided at the flat plate member on the third glass substrate M3 side of the clamping device, and the first metal layer 561 and the third metal layer 562 are heated.

As a result, as illustrated in FIG. 12B, the second bonded body M20 and the third glass substrate M3 are bonded by the second bonding portion 56. As a result, the second inner space Sp2 surrounded by each first substrate 51 provided at the first glass substrate M1, each third substrate 53 provided at the third glass substrate M3, and the second bonding portion 56 is maintained in a reduced pressure environment with a pressure lower than atmospheric pressure, and hermetically sealed.

Cutting Step

After the second bonding step S7, the cutting step S8 is performed.

In order to maintain a pressure between the first substrate 51 and the second substrate 52 in a reduced state, the cutting step S8 is performed while a third bonded body M30 bonded by the second bonding step S7 is placed in a vacuum chamber under a reduced pressure environment with a pressure lower than atmospheric pressure. In the cutting step S8, the third bonded body M30 is cut using, for example, a laser cut, and the interference filter 5 is cut chip by chip.

Thereafter, the seal portion 553 is injected to the extraction portion 511B of each interference filter 5 cut out chip by chip, to seal the extraction portion 511B. As a result, the first inner space Sp1 is maintained in a reduced pressure environment with a pressure lower than atmospheric pressure, and hermetically sealed.

As described above, the interference filter 5 is manufactured.

Operations and Effects of First Exemplary Embodiment

The interference filter 5 of the present exemplary embodiment includes the first substrate 51, the second substrate 52, the third substrate 53, the fourth substrate 54, the first bonding portion 55, the second bonding portion 56, and the third bonding portion 57. The first substrate 51 is a transmissive substrate including the first inner surface 51A and the first outer surface 51B that are front and back sides, respectively, and provided with the first reflection film 581 at the first inner surface 51A. The second substrate 52 is a transmissive substrate including the second inner surface 52A and the second outer surface 52B that are front and back sides, respectively, and provided with the second reflection film 582 facing the first reflection film 581 at the second inner surface 52A. The third substrate 53 is a transmissive substrate disposed facing the first outer surface 51B of the first substrate 51. The fourth substrate 54 is a transmissive substrate disposed facing the second outer surface 52B of the second substrate 52. The first bonding portion 55 bonds the first inner surface 51A and the second inner surface 52A, and seals the first inner space Sp1 between the first substrate 51 and the second substrate 52. The second bonding portion 56 bonds the first outer surface 51B and the third substrate 53, and seals the second inner space Sp2 between the first substrate 51 and the third substrate 53. The third bonding portion 57 bonds the second outer surface 52B and the fourth substrate 54, and seals the third inner space Sp3 between the second substrate 52 and the fourth substrate 54. Then the first inner space Sp1, the second inner space Sp2, and the third inner space Sp3 are each maintained in a reduced pressure environment with a pressure lower than atmospheric pressure.

In the interference filter 5 having such a configuration, the first substrate 51 provided with the first reflection film 581 is sandwiched between the first inner space Sp1 and the second interior space Sp2 each maintained in a reduced pressure environment. Additionally, the second substrate 52 provided with the second reflection film 582 is sandwiched between the first inner space Sp1 and the third inner space Sp3 each maintained in a reduced pressure environment. Accordingly, the first substrate 51 and the second substrate 52 are not flexed due to a pressure difference between both the spaces sandwiching the substrates, and an effect of flexure of the first reflection film 581 or the second reflection film 582 can be suppressed, and the interference filter 5 capable of dispersing light having a desired wavelength with high accuracy is obtained. That is, when light having a target wavelength corresponding to the gap G1 is emitted from the interference filter 5, it is possible to suppress contamination of light having a wavelength different from the target wavelength into the emitted light, and spectral characteristics having a high degree of accuracy with a narrow wavelength half-width can be obtained.

In addition, since the first inner space Sp1 and the third inner space S3 sandwiching the movable portion 521 are each brought into a reduced pressure environment, resistance during driving of the movable portion 521 can be reduced, and responsiveness of the electrostatic actuator 59 when a voltage is applied can be improved.

Furthermore, in the interference filter 5 of the present exemplary embodiment, a package housing for maintaining a space, between the first substrate 51 and the second substrate 52, to be depressurized is not required. That is, in the past, an interference filter has been known that is configured only with the first substrate 51 provided with the first reflection film 581 and the second substrate 52 provided with the second reflection film 582, but such an existing interference filter is used while being stored in a package housing where an inner space is maintained in a reduced pressure environment. However, such a package housing is typically configured by ceramic or the like to maintain a reduced pressure environment, and miniaturization of the package housing that stores the interference filter, and miniaturization of an electronic device such as the spectroscopy measurement device 1 in which the package housing is incorporated are difficult. In contrast, the interference filter 5 of the present exemplary embodiment can maintain each of the first inner space Sp1, the second inner space Sp2, and the third inner space Sp3 in a reduced pressure environment wafer by wafer, and it is not necessary to use a package housing as in the case of an existing interference filter, thus miniaturization is possible, and miniaturization of an electronic device such as the spectroscopy measurement device 1 in which the interference filter 5 is incorporated is possible.

In the interference filter 5 of the present exemplary embodiment, the second bonding portion 56 bonds the first substrate 51 and the third substrate 53, by the first metal layer 561 provided at the first outer surface 51B, and the third metal layer 562 provided at the third inner surface 53A of the third substrate 53 facing the first substrate 51 being metal-bonded. Similarly, the third bonding portion 57 bonds the second substrate 52 and the fourth substrate 54, by the second metal layer 571 provided at the second outer surface 52B and the fourth metal layer 572 provided at the fourth inner surface 54A of the fourth substrate 54 facing the second substrate 52 being metal-bonded.

Such bonding of substrates by metal bonding has high bonding strength, and an entire surface of a metal layer surface is in close contact, and thus a bonding with high airtightness can be performed. Therefore, high airtightness of the second inner space Sp2 and the third inner space Sp3 can be maintained.

In the present exemplary embodiment, the first bonding portion 55 bonds the first substrate and the second substrate by an elastic layer having a smaller elastic modulus than that of a metal film. Specifically, the first elastic layer 551 and the second elastic layer 552 constituting the first bonding portion 55 are each formed of a plasma polymerized film having a siloxane as a main component.

In such bonding using the first elastic layer 551 and the second elastic layer 552, even if foreign matter or the like adheres to a surface of the first elastic layer 551 or the second elastic layer 552, influence of the foreign matter or the like can be suppressed by elastic deformation, and an inclination of the first substrate 51 or the second substrate 52 during bonding can be suppressed. Thus, a high degree of parallelism between the first reflection film 581 provided at the first substrate 51 and the second reflection film 582 provided at the second substrate 52 can be maintained.

Additionally, in the present exemplary embodiment, as the method of manufacturing the interference filter 5, the first substrate forming step S1, the second substrate forming step S2, the first bonding step S5, the third bonding step S6, and the second bonding step S7 are performed. In the first substrate forming step S1, the first substrate 51 is formed by forming the first reflection film 581 at the first inner surface 51A of the first glass substrate M1 at which the first substrates 51 are disposed in an array. In the second substrate forming step S2, the second substrate 52 is formed by forming the second reflection film 582 at the second inner surface 52A of the second glass substrate M2 at which the second substrates 52 are disposed in an array. In the first bonding step S5, the first inner surface 51A and the second inner surface 52A are bonded by the first bonding portion 55 in a reduced pressure environment with a pressure lower than atmospheric pressure. In the second bonding step S7, the first outer surface 51B and the third substrate 53 are bonded by the second bonding portion 56 in a reduced pressure environment with a pressure lower than atmospheric pressure. In the third bonding step S6, the second outer surface 52B and the fourth substrate 54 are bonded by the third bonding portion 57 in a reduced pressure environment with a pressure lower than atmospheric pressure.

In this way, as described above, a small interference filter 5 capable of dispersing light having a desired wavelength with high accuracy, and having high drive responsiveness can be manufactured.

In the present exemplary embodiment, the first masking step, the first elastic layer forming step, the second masking step, and the second elastic layer forming step are performed in the manufacturing method of the interference filter 5. In the first masking step, the first mask M11 covering the first reflection film 581 is formed at the first glass substrate M1. In the first elastic layer forming step, the first elastic layer 551, which is a plasma polymerized film having a siloxane as a main component, is formed at the first inner surface 51A, and then the first mask M11 is removed by a lift-off process. In the second masking step, the second mask M21 covering the second reflection film 582 is formed at the second glass substrate M2. In the second elastic layer forming step, the second elastic layer 552, which is a plasma polymerized film having a siloxane as a main component, is formed at the second inner surface 52A, and then the second mask M21 is removed. In addition, in the first bonding step S5, the first bonding portion 55 is formed in which the first elastic layer 551 and the second elastic layer 552 are bonded in a reduced pressure environment with a pressure lower than atmospheric pressure, and the first substrate 51 and the second substrate 52 are bonded.

In the present exemplary embodiment, the first elastic layer 551 and the second elastic layer 552, which are plasma polymerized films, are formed by bonding the first substrate 51 and the second substrate 52. When the plasma polymerized film is formed, and the first reflection film 581 or the second reflection film 582 is exposed to plasma, spectral characteristics of the interference filter 5 deteriorate due to deterioration of the reflection film. In contrast, in the present exemplary embodiment, by forming the first mask M11 and the second mask M21, the first reflection film 581 and the second reflection film 582 can be protected.

Note that, when metal bonding is performed using a metal film as the first bonding portion 55, it is necessary to activate the metal layer with a plasma activation process, or the like during bonding. However, after the activation process, since the mask cannot be removed by a lift-off process, or the like, the first reflection film 581 or the second reflection film 582 is exposed to plasma, or the like, when the metal film is activated, and characteristics of the interference filter 5 deteriorate due to deterioration of the reflection film. In the present exemplary embodiment, such an inconvenience can be avoided, and the interference filter 5 having good spectral characteristics can be manufactured.

In the present exemplary embodiment, in the manufacturing of the interference filter 5, the first metal forming step and the third metal forming step are performed in the second bonding step S7. In the first metal forming step, the first metal layer 561 is formed at the first outer surface 51B, and in the third metal forming step, the third metal layer 562 is provided at the third inner surface 53A. In addition, in the second bonding step S7, a load is applied in a direction in which the first substrate 51 and the third substrate 53 come close to each other, to form the second bonding portion 56 in which the first metal layer 561 and the third metal layer 562 are metal-bonded, and the first substrate 51 and the third substrate 53 are bonded.

In addition, in the third bonding step S6, the second metal forming step and the fourth metal forming step are performed. In the second metal forming step, the second metal layer 571 is formed at the second outer surface 52B, and in the fourth metal forming step, the fourth metal layer 572 is formed at the fourth inner surface 54A. In the third bonding step S6, a load is applied in a direction in which the second substrate 52 and the fourth substrate 54 come close to each other, to form the third bonding portion 57 in which the second metal layer 571 and the fourth metal layer 572 are metal-bonded, and the second substrate 52 and the fourth substrate 54 are bonded.

As a result, as described above, each of the first substrate 51 and the third substrate 53, the second substrate 52, and the fourth substrate 54 can be bonded, by metal bonding having high bonding strength and having high airtightness. Therefore, high airtightness of the second inner space Sp2 and the third inner space Sp3 can be maintained.

In the manufacturing of the interference filter 5 of the present exemplary embodiment, the second substrate forming step S2 includes the second substrate etching step for etching the second outer surface 52B to form the movable portion 521 having a predetermined thickness, and the diaphragm portion 522 thinner than the movable portion 521, and the second reflection film forming step for forming the second reflection film 582 at the second inner surface 52A of the movable portion 521. Then, in the present exemplary embodiment, the third bonding step S6 is performed before the second bonding step S7.

That is, in the present exemplary embodiment, in the second substrate forming step S2, the second substrate 52 is formed that includes the movable portion 521, and the diaphragm portion 522 that movably holds the movable portion 521. For such a second substrate 52, when a direct stress is applied to the movable portion 521, there is a possibility that the diaphragm portion 522 is damaged, or the movable portion 521 is inclined due to an excessive stress. For example, when the second bonding step S7 is first performed for the first bonded body M10 before the third bonding step S6, a flat plate member of a clamping device abuts on the second glass substrate M2 of the first bonded body M10, and thus, a direct stress is undesirably applied to the movable portion 521 from the flat plate member.

In contrast, in the present exemplary embodiment, the third bonding step S6 is performed before the second bonding step S7, to bond the fourth substrate 54 to the second substrate 52. This allows the movable portion 521 of the second substrate 52 to be protected by the fourth substrate 54. That is, when performing the second bonding step S7, the fourth substrate 54 covering the second substrate 52 abuts on the flat plate member of the clamping device, a direct stress is not applied to the second substrate 52, and thus an inclination of the movable portion 521, or damage to the diaphragm portion 522 can be suppressed.

Other Exemplary Embodiments

Note that the present disclosure is not limited to each of the exemplary embodiments described above, and variations, modifications, and the like within the scope in which the object of the present disclosure can be achieved are included in the present disclosure.

Modification Example 1

For example, in the exemplary embodiment described above, the first inner space Sp1 and the third inner space Sp3 are each an independent airtight space, but the first interior space Sp1 and the third inner space Sp3 may be communicated. More specifically, the diaphragm portion 522 may be provided with a through hole for communicating the first inner space Sp1 and the third inner space Sp3. In this case, an inner pressure difference between the first inner space Sp1 and the third inner space Sp3 can be eliminated when the movable portion 521 is displaced, and drive responsiveness of the movable portion 521 can be further increased.

Modification Example 2

In the exemplary embodiment described above, as the first bonding portion 55, the configuration has been illustrated in which the gap between the first elastic layer 551 and the second elastic layer 552 in the extraction portion 511B is sealed by the seal portion 553, but the present disclosure is not limited thereto. For example, by forming the first elastic layer 551 in the extraction portion 511B to a height position of the first elastic layer 551 of the first bonding target portion 514, the first elastic layer 551 and the second elastic layer 552 can be bonded even in the extraction portion 511B. Alternatively, in the extraction portion 511B, the insulating portion 594 may be formed to a height position of the first bonding target portion 514, and even in this case, the seal portion 553 is not required.

Modification Example 3

In the exemplary embodiment described above, in the first bonding step S5, after bonding the first glass substrate M1 and the second glass substrate M2 in the vacuum chamber, in a state where the first bonded body M10 obtained by bonding is held in the vacuum chamber, the subsequent third bonding step S6, second bonding step S7, and cutting step S8 are performed to perform sealing by the seal portion 553.

In contrast, the bonding of the first elastic layer 551 and the second elastic layer 552 in the first bonding step S5 need not be performed under a reduced pressure. In this case, after the interference filter 5 is cut out chip by chip in the cutting step S8, each interference filter is put into the vacuum chamber, and the first inner space Sp1 is brought into a reduced pressure state, and it is sufficient that a gap in the extraction portion 511B is sealed by the seal portion 553 constituting the first bonding portion 55.

Additionally, as described in Modification Example 2, when the first elastic layer 551 of the extraction portion 511B is formed to the same height position as that of the first elastic layer 551 at the first bonding target portion 514, or when the insulating portion 594 formed at the extraction portion 511B is formed to a height position of the first bonding target portion 514 in the first substrate forming step S1, the first inner space Sp1 is sealed by performing the first bonding step S5. Therefore, after the first bonded body M10 and the second bonded body M20 are taken out from the vacuum chamber, the first metal layer 561 or the second metal layer 571 can be formed.

Modification Example 4

In the present exemplary embodiment, the example has been illustrated in which the second bonding portion 56 and the third bonding portion 57 are bonded by metal bonding, but the present disclosure is not limited thereto. Plasma polymerized bonding that bonds plasma polymerized films to each other may be used for either, or both of the second bonding portion 56 and the third bonding portion 57, as in the case of the first bonding portion 55.

Modification Example 5

The example has been illustrated in which the first bonding portion 55 includes the first elastic layer 551 and the second elastic layer 552, which are plasma polymerized films having siloxane as a main component, and the first elastic layer 551 and the second elastic layer 552 are bonded by siloxane bonding, however, the present disclosure is not limited thereto. The first elastic layer 551 and the second elastic layer 552 may each be formed of a material such as resin having a smaller elastic modulus than that of metal.

Further, metal bonding using a metal film may be used for the first bonding portion 55, as in the cases of the second bonding portion 56 and the third bonding portion 57. In this case, when foreign matter or the like of a metal film adheres at the time of bonding, there is a possibility that a degree of parallelism between the first reflection film 581 and the second reflection film 582 deteriorates. In contrast, it is possible to suppress an effect of foreign matter, by forming foundation layers constituted by resin or the like between the first substrate 51 and the metal layer, and between the second substrate 52 and the metal layer, respectively.

Modification Example 6

In each of the above-described exemplary embodiments, the electrostatic actuator 59 has been illustrated as a gap change portion for driving the movable portion 521, but the present disclosure is not limited thereto.

For example, for as the gap change portion, a configuration may be adopted in which, a dielectric actuator is used that includes a first dielectric coil provided at the first substrate 51, and a second dielectric coil or a permanent magnet provided at the second substrate 52.

Furthermore, a configuration may be adopted in which a piezoelectric actuator is used instead of the electrostatic actuator 59. In this case, for example, a lower electrode layer, a piezoelectric film, and an upper electrode layer are disposed in a stacked manner at the diaphragm portion 522, and a voltage applied between the lower electrode layer and the upper electrode layer is varied as an input value, so that the piezoelectric film can be expanded or contracted to flex the diaphragm portion 522.

Modification Example 7

Furthermore, the present disclosure can be applied to a wavelength-fixed type Fabry-Perot etalon, which is not provided with a gap change portion.

A wavelength-fixed interference filter is not provided with the movable portion 521 and the diaphragm portion 522 as in the above-described exemplary embodiment, and the gap G1 between the first substrate 51 and the second substrate 52 is maintained constant.

At this time, since the first substrate 51 and the second substrate 52 are bonded with high airtightness by the first bonding portion 55, intrusion of foreign matter between the first substrate 51 and the second substrate 52 can be suitably prevented, and deterioration of the reflection films 581 and 582 can be suppressed. Additionally, the third substrate 53 is bonded to the first substrate 51 by the second bonding portion 56, and the fourth substrate 54 is bonded to the second substrate 52 by the third bonding portion 57, and thus a pressure difference between the first inner space Sp1, and the second inner space Sp2 and the third inner space Sp3 is constant, regardless of an installation environment of the interference filter 5. That is, depending on the installation environment of the interference filter, even when the third substrate 53 and the fourth substrate 54 are subjected to pressure, the second inner space Sp2 or the third inner space Sp3 functions as a cushion, and inner pressure changes in the first inner space Sp1 are suppressed. As a result, a high degree of parallelism between the first reflection film 581 and the second reflection film 582 can be maintained.

Modification Example 8

In the above exemplary embodiment, the spectroscopy measurement device 1 has been illustrated as an example of an electronic device in which the interference filter 5 is incorporated, but the present disclosure is not limited thereto. The interference filter 5 can be appropriately incorporated in an electronic device that selects a predetermined wavelength from incident light and emits the wavelength, such as a spectroscopic camera or a light source device.

What is claimed is:

1. An interference filter, comprising:
a first substrate including a first inner surface and a first outer surface facing each other, the first substrate being transmissive and including, at the first inner surface, a first reflection film;
a second substrate including a second inner surface and a second outer surface facing each other, the second substrate being transmissive and including, at the second inner surface, a second reflection film facing the first reflection film;
a first bonding portion configured to bond the first inner surface and the second inner surface to each other, the first bonding portion sealing a first inner space between the first substrate and the second substrate;
a transmissive third substrate facing the first outer surface;
a second bonding portion configured to bond the first outer surface and the transmissive third substrate to each other, the second bonding portion sealing a second inner space between the first substrate and the transmissive third substrate;
a transmissive fourth substrate facing the second outer surface; and
a third bonding portion configured to bond the second outer surface and the transmissive fourth substrate to each other, the third bonding portion sealing a third inner space between the second substrate and the transmissive fourth substrate, wherein
the first inner space, the second inner space, and the third inner space are lower in pressure than atmospheric pressure.

2. The interference filter according to claim 1, wherein
the second bonding portion bonds the first substrate and the transmissive third substrate, by a first metal layer provided at the first outer surface, and a third metal layer provided at a third facing surface of the transmissive third substrate facing the first substrate being metal-bonded, and
the third bonding portion bonds the second substrate and the transmissive fourth substrate, by a second metal layer provided at the second outer surface, and a fourth metal layer provided at a fourth facing surface of the transmissive fourth substrate facing the second substrate being metal-bonded.

3. The interference filter according to claim 1, wherein
the first bonding portion bonds the first substrate and the second substrate by an elastic layer having an elastic modulus smaller than that of a metal film.

4. The interference filter according to claim 3, wherein
the elastic layer is a plasma polymerized film having a siloxane as a main component.

5. A method of manufacturing an interference filter, comprising:
performing
a first substrate forming step for forming a first reflection film at a first inner surface of a transmissive first substrate including the first inner surface and a first outer surface facing each other;
a second substrate forming step for forming a second reflection film at a second inner surface of a transmissive second substrate including the second inner surface and a second outer surface facing each other;
a first bonding step for bonding the first inner surface and the second inner surface to each other by a first bonding portion and sealing a first inner space between the first substrate and the second substrate, in a reduced pressure environment with a pressure lower than atmospheric pressure;
a second bonding step for bonding the first outer surface and a transmissive third substrate to each other by a second bonding portion and sealing a second inner space between the first substrate and the transmissive third substrate, in the reduced pressure environment with the pressure lower than the atmospheric pressure; and
a third bonding step for bonding the second outer surface and a transmissive fourth substrate to each other by a third bonding portion and sealing a third inner space between the second substrate and the transmissive fourth substrate, in the reduced pressure environment with the pressure lower than the atmospheric pressure.

6. The method of manufacturing the interference filter according to claim 5, comprising:
a first masking step for covering the first reflection film with a first mask;
a first elastic layer forming step for forming, at the first inner surface, a first elastic layer that is a plasma polymerized film having a siloxane as a main component, and removing the first mask;

a second masking step for covering the second reflection film with a second mask; and a second elastic layer forming step for forming, at the second inner surface, a second elastic layer that is a plasma polymerized film having a siloxane as a main component, and removing the second mask, wherein the first bonding step includes forming the first bonding portion in which the first elastic layer at the first inner surface and the second elastic layer at the second inner surface are bonded to each other to bond the first substrate and the second substrate to each other, in the reduced pressure environment with the pressure lower than the atmospheric pressure.

7. The method of manufacturing the interference filter according to claim 5, comprising:

a first metal forming step for forming a first metal layer at the first outer surface;

a third metal forming step for forming a third metal layer at a third facing surface of the transmissive third substrate facing the first substrate;

a second metal forming step for forming a second metal layer at the second outer surface; and a fourth metal forming step for forming a fourth metal layer at a fourth facing surface of the transmissive fourth substrate facing the second substrate, wherein the second bonding step includes applying a load in a direction in which the first substrate and the transmissive third substrate come close to each other to form the second bonding portion in which the first metal layer and the third metal layer are metal-bonded, thereby bonding the first substrate and the transmissive third substrate, and the third bonding step includes applying a load in a direction in which the second substrate and the transmissive fourth substrate come close to each other to form the third bonding portion in which the second metal layer and the fourth metal layer are metal-bonded, thereby bonding the second substrate and the transmissive fourth substrate.

8. The method of manufacturing the interference filter according to claim 7, wherein the second substrate forming step includes a second substrate etching step for etching the second outer surface to form a movable portion having a predetermined thickness, and a diaphragm portion thinner than the movable portion, and a second reflection film forming step for forming the second reflection film at the second inner surface of the movable portion, and the third bonding step is performed before the second bonding step.

\* \* \* \* \*